US012529980B2

(12) United States Patent
Takeuchi et al.

(10) Patent No.: US 12,529,980 B2
(45) Date of Patent: Jan. 20, 2026

(54) IMAGE FORMING APPARATUS

(71) Applicant: CANON KABUSHIKI KAISHA, Tokyo (JP)

(72) Inventors: Toshiaki Takeuchi, Shizuoka (JP); Shuichi Gofuku, Shizuoka (JP); Takayuki Yada, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/950,367

(22) Filed: Nov. 18, 2024

(65) Prior Publication Data

US 2025/0164909 A1 May 22, 2025

(30) Foreign Application Priority Data

Nov. 21, 2023 (JP) ................................ 2023-197549

(51) Int. Cl.
*G03G 15/08* (2006.01)
*G03G 21/18* (2006.01)

(52) U.S. Cl.
CPC ..... *G03G 15/0882* (2013.01); *G03G 15/0822* (2013.01); *G03G 15/0863* (2013.01); *G03G 15/0865* (2013.01); *G03G 15/0877* (2013.01); *G03G 15/0881* (2013.01); *G03G 15/0889* (2013.01); *G03G 15/0891* (2013.01); *G03G 15/0896* (2013.01); *G03G 21/1857* (2013.01)

(58) Field of Classification Search
CPC ........... G03G 15/0889; G03G 15/0863; G03G 15/0882; G03G 15/0891; G03G 15/0822; G03G 15/0865; G03G 15/0877; G03G 15/0881; G03G 15/0896; G03G 21/1857
See application file for complete search history.

(56) References Cited

U.S. PATENT DOCUMENTS

| | | | | |
|---|---|---|---|---|
| 9,465,318 | B2 | 10/2016 | Takeuchi et al. | |
| 9,523,942 | B2 | 12/2016 | Takeuchi et al. | |
| 9,989,892 | B2 | 6/2018 | Takeuchi et al. | |
| 2016/0004185 | A1 * | 1/2016 | Enokuchi ........... | G03G 15/0867 399/262 |
| 2024/0210855 | A1 * | 6/2024 | Yamamoto ......... | G03G 15/0867 |
| 2024/0272567 | A1 * | 8/2024 | Fujino ................ | G03G 15/0886 |

FOREIGN PATENT DOCUMENTS

| | | | |
|---|---|---|---|
| JP | 2014-066967 | A | 4/2014 |
| JP | 2016-035551 | A | 3/2016 |
| JP | 2017-044834 | A | 3/2017 |
| JP | 2022-139159 | A | 9/2022 |

* cited by examiner

*Primary Examiner* — Joseph S Wong
(74) *Attorney, Agent, or Firm* — VENABLE LLP

(57) ABSTRACT

A cartridge that is attachable to and detachable from an apparatus main body includes: a storage portion that includes a discharge port for developer; a stirring member disposed inside the storage portion; a pump capable of varying the volume of the storage portion; and a sealing member including a sealing portion, which is attached to an inner wall of the storage portion so as to seal the discharge port, with the sealing portion being peeled off from the inner wall by rotation of the stirring member. When the cartridge is unused, the apparatus main body provides the cartridge with a driving force for the pump after a driving force for the stirring member is provided, and the sealing portion is at least partially peeled off from the inner wall, and moreover the discharge port makes the inside and the outside of the storage portion communicate with each other.

17 Claims, 18 Drawing Sheets

IMAGE FORMING APPARATUS

BACKGROUND OF THE INVENTION

Field of the Invention

The present invention relates to an image forming apparatus that forms an image on a recording material by using an electrophotographic system.

Description of the Related Art

Conventionally, an electrophotographic image forming apparatus has a configuration in which a developer replenishing container that stores toner is detachably provided in the image forming apparatus in order to replenish toner (developer) consumed in image formation. Japanese Patent Application Publication No. 2014-066967 describes a technique of sealing the toner supply opening of a cartridge with a sealing member and peeling off the sealing member when the cartridge is used. Furthermore, Japanese Patent Application Publication No. 2022-139159 proposes a configuration that uses a pump as a unit for discharging toner from a toner cartridge in order to replenish the cartridge with toner.

SUMMARY OF THE INVENTION

During an initial operation that drives respective parts of a cartridge before an image forming operation, an action of peeling off the sealing member is additionally performed when the cartridge is new. This may significantly increase the load on the motor depending on the combination of operation timings of respective members and the toner storage condition. The increase in the motor load may lead to damage to the components forming the drive portion and the motor itself.

An object of the present invention is to provide a technique capable of reducing the operational load in a toner cartridge that is used by peeling off a sealing member that seals a toner discharge port.

In order to solve the above problems, an image forming apparatus according to the present invention includes:

- an apparatus main body including an image forming portion forming an image on a recording material by using developer; and
- a cartridge configured to be attachable to and detachable from the apparatus main body and capable of supplying the developer to the image forming portion,
- wherein the cartridge includes:
  - a storage portion that stores the developer and includes a discharge port for the developer;
  - a stirring member rotatably disposed inside the storage portion;
  - a variable-volume pump disposed in the storage portion so as to form, together with the storage portion, a storage space for the developer in the cartridge; and
  - a sealing member including a sealing portion attached to an inner wall of the storage portion so as to seal the discharge port in a case where the cartridge is unused, and a fixed portion fixed to the stirring member, the sealing member being configured such that the sealing portion is peeled off from the inner wall by rotation of the stirring member, and
- wherein the apparatus main body includes:
  - a first drive portion providing the cartridge with a first driving force that drives the stirring member; and
  - a second drive portion providing the cartridge with a second driving force that drives the pump, and
- wherein the second drive portion provides, in a case where the cartridge is unused, the cartridge with the second driving force after the first drive portion has started providing the first driving force, and the sealing portion is at least partially peeled off from the inner wall, and moreover the discharge port makes inside and outside of the storage portion communicate with each other.

In order to solve the above problems, an image forming apparatus according to the present invention includes:

- an apparatus main body including an image forming portion forming an image on a recording material by using developer; and
- a cartridge configured to be attachable to and detachable from the apparatus main body and capable of supplying the developer to the image forming portion,
- wherein the cartridge includes:
  - a storage portion that stores developer and includes a discharge port for the developer;
  - a stirring member rotatably disposed inside the storage portion;
  - a variable-volume pump disposed in the storage portion so as to form, together with the storage portion, a storage space for the developer in the cartridge; and
  - a sealing member including a sealing portion attached to an inner wall of the storage portion so as to seal the discharge port in a case where the cartridge is unused, and a fixed portion fixed to the stirring member, the sealing member being configured such that the sealing portion is peeled off from the inner wall by rotation of the stirring member,
- wherein the apparatus main body includes:
  - a first drive portion providing the cartridge with a first driving force that drives the stirring member; and
  - a second drive portion providing the cartridge with a second driving force that drives the pump, and
- wherein the second drive portion provides, in a case where the cartridge is unused, the cartridge with the second driving force after the first drive portion has started providing the first driving force.

According to the present invention, it is possible to reduce the operational load in a toner cartridge that is used by peeling off a sealing member that seals a toner discharge port.

Further features of the present invention will become apparent from the following description of exemplary embodiments with reference to the attached drawings.

DESCRIPTION OF THE EMBODIMENTS

First Embodiment

Figure 1:
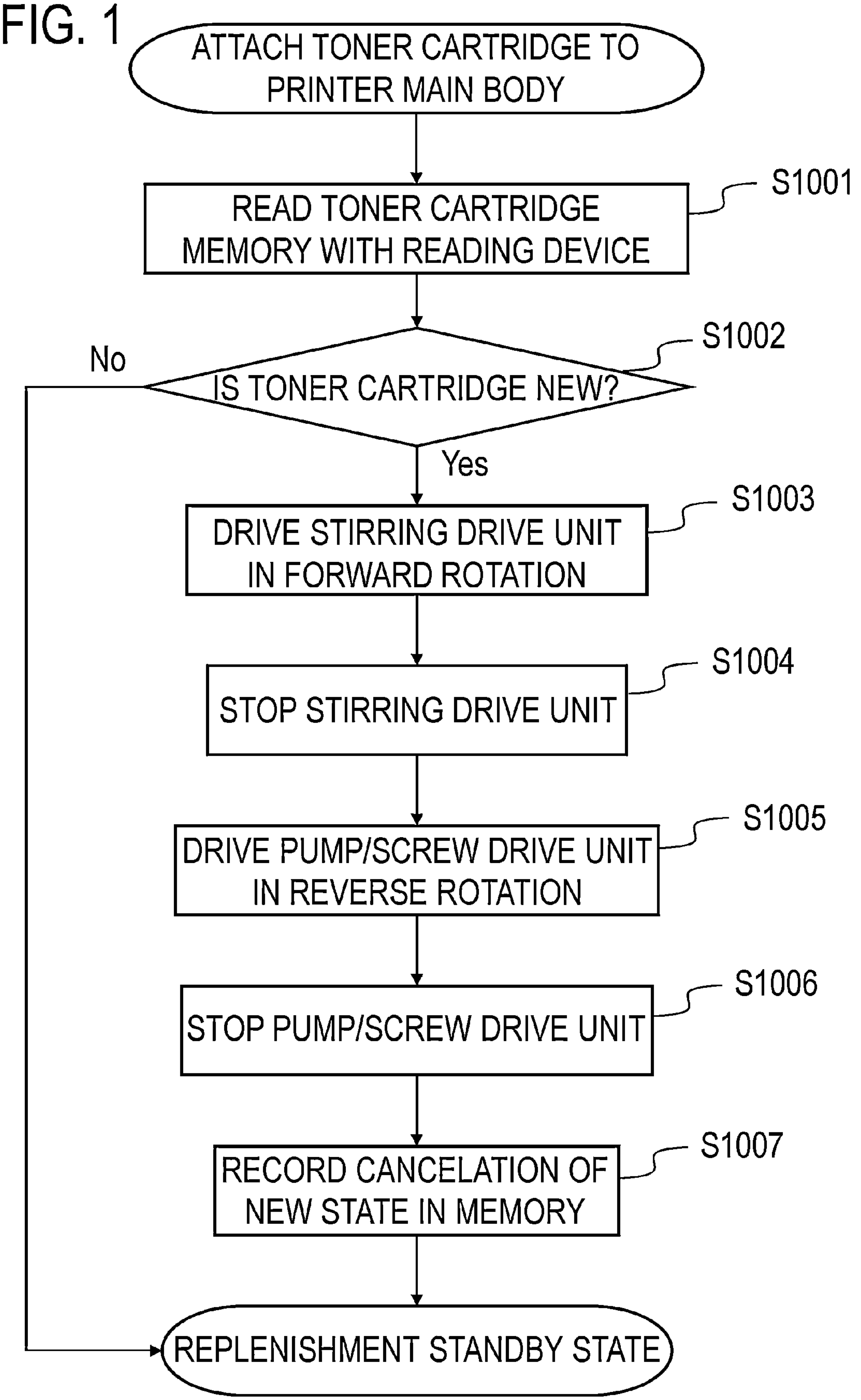
FIG. 1 is a flowchart showing the operation of an initial sequence.

Referring to the drawings, exemplary modes for carrying out the present invention will be described in detail using embodiments. However, the dimensions, materials, shapes, and relative arrangements of the components described in the embodiments may be modified as appropriate according to the configuration of the apparatus to which the invention is applied and various conditions. That is, the description is not intended to limit the scope of the present invention to the following embodiments.

Overview of Laser Printer

Figure 12:
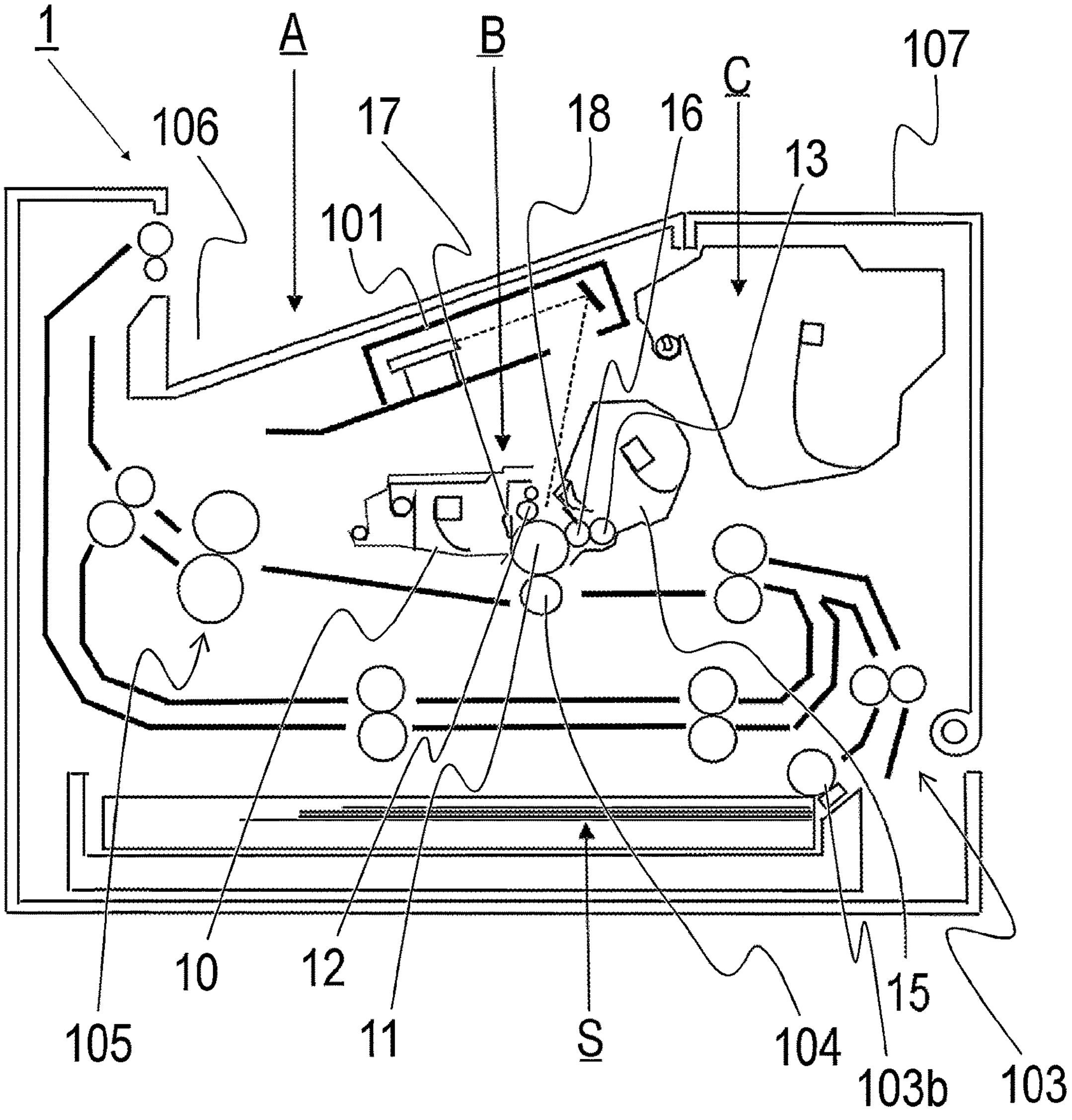
FIG. 12 is a schematic cross-sectional view showing a schematic configuration of an image forming apparatus according to an embodiment.

FIG. 12 is a cross-sectional view showing a schematic configuration of a laser printer, which is an example of an image forming apparatus. As shown in FIG. 12, a laser printer 1 includes a printer main body A, a process cartridge B, and a toner cartridge C. The printer main body A as the apparatus main body includes a sheet feeding portion 103, a transfer roller 104, a fixing portion 105, and a laser scanner 101. Also, the process cartridge B and the toner cartridge C are attachably and detachably disposed in the printer main body A.

Figure 2:
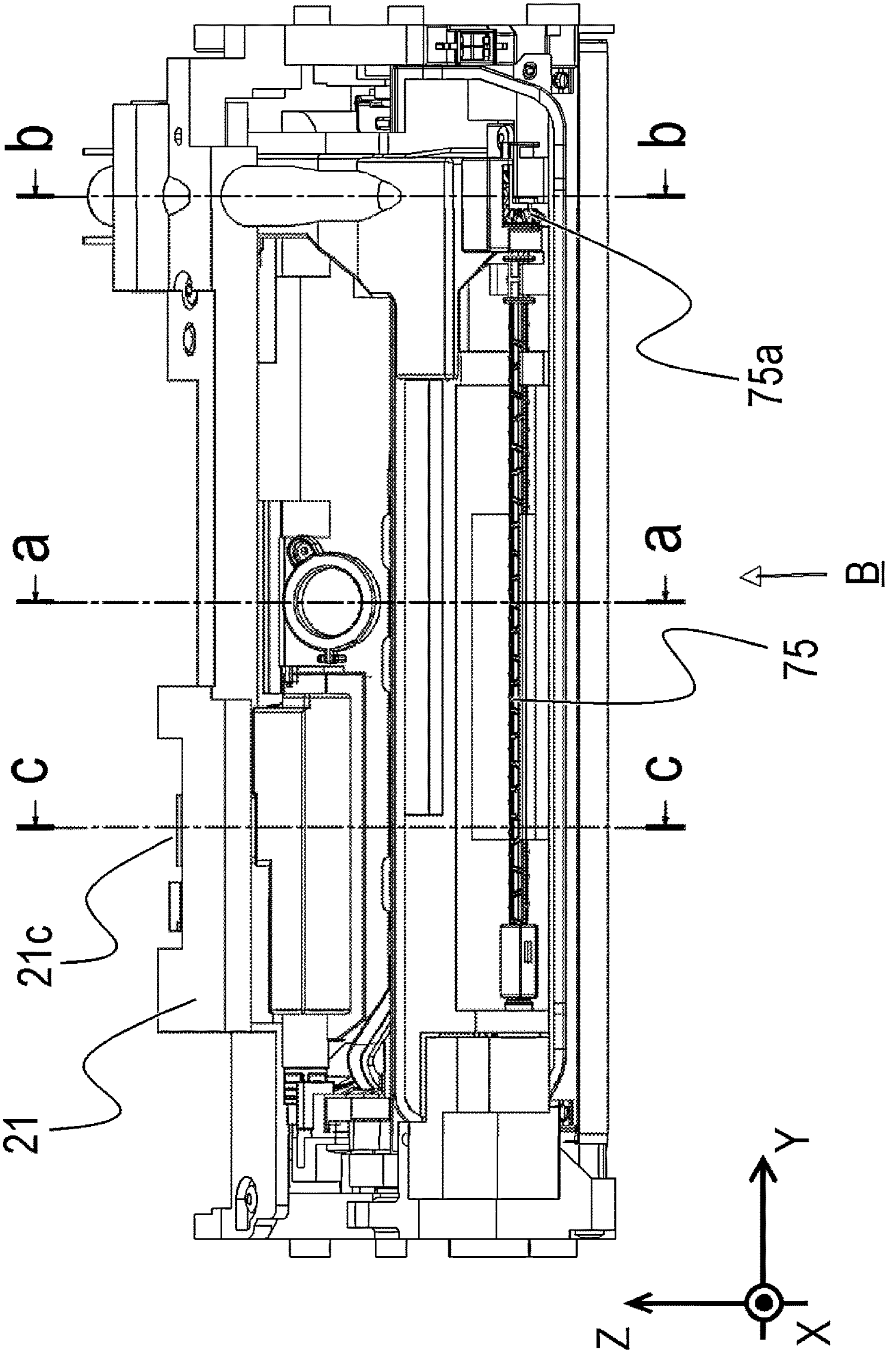
FIG. 2 is a front view showing an outline of a process cartridge.
Figure 3:
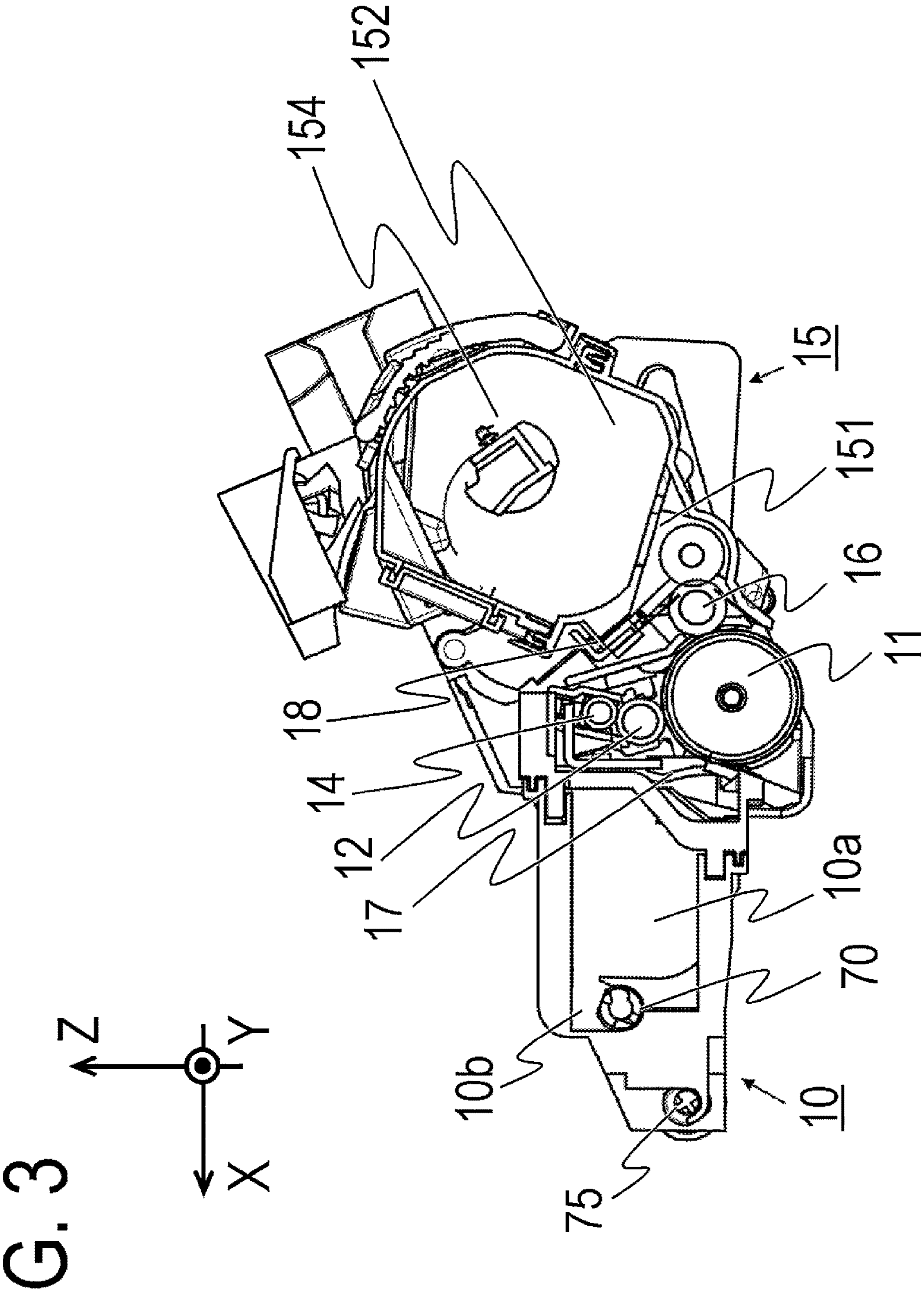
FIG. 3 is a cross-sectional view showing a schematic configuration of the process cartridge.
Figure 4:
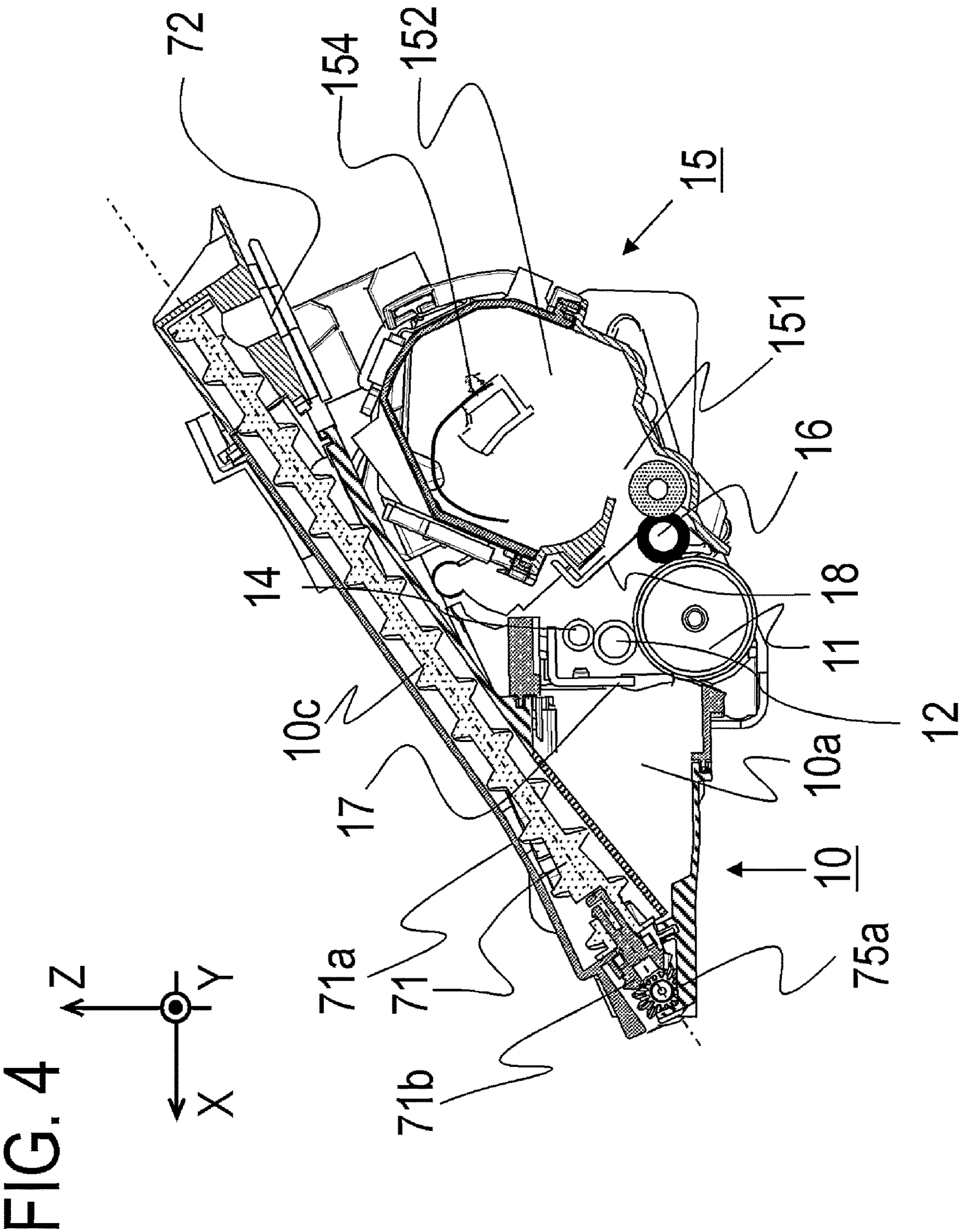
FIG. 4 is a cross-sectional view showing a second waste toner conveyance passage of the process cartridge.
Figure 5:
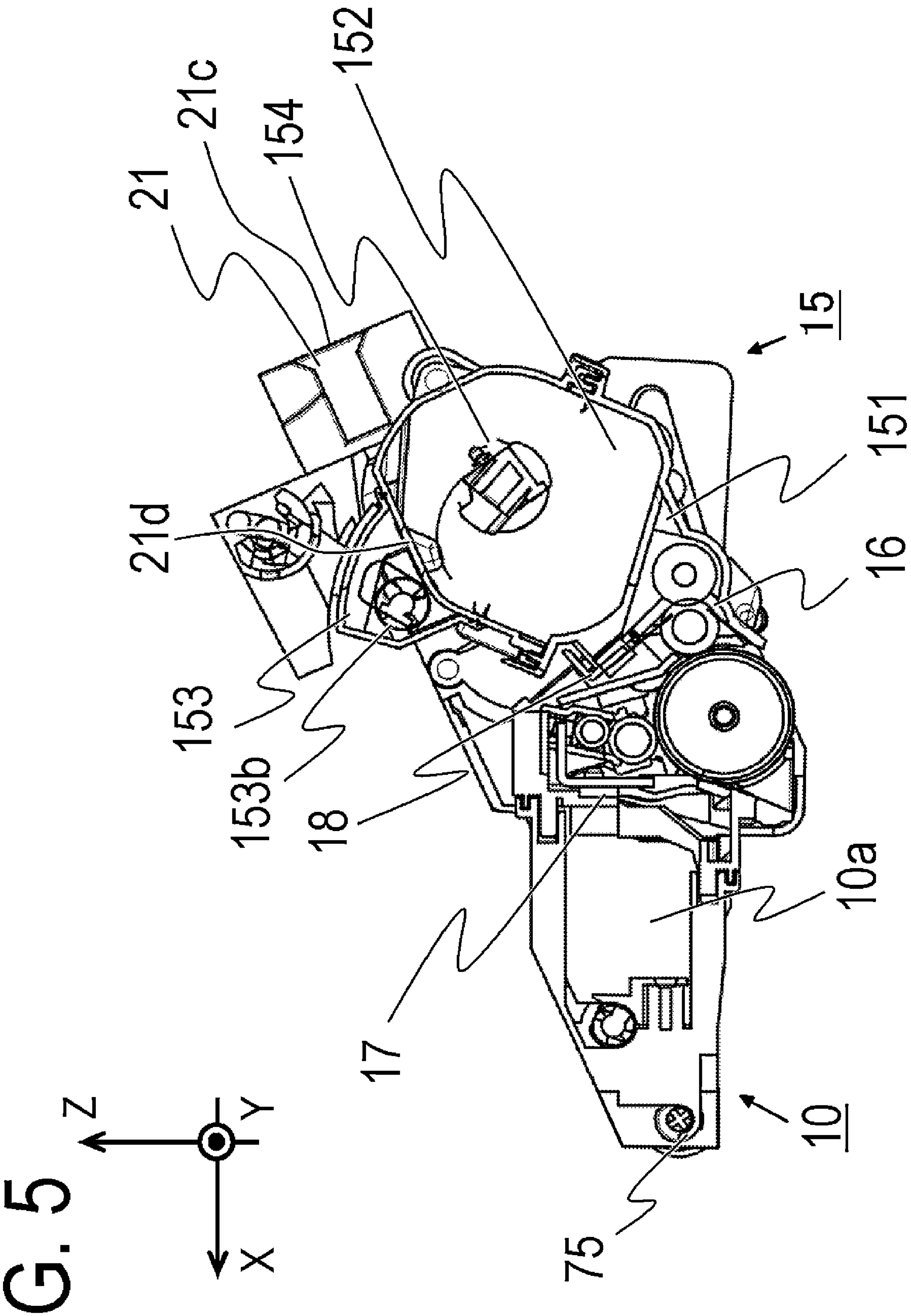
FIG. 5 is a cross-sectional view showing a replenishment port of the process cartridge.

Referring to FIGS. 2, 3, 4, and 5, the configuration of the process cartridge B is now described. FIG. 2 is a front view showing a schematic configuration of the process cartridge B. FIG. 3 is a schematic cross-sectional view showing a schematic configuration of the process cartridge B (cross-section taken along line a-a in FIG. 2). FIG. 4 is a schematic cross-sectional view showing a second waste toner conveyance passage 10*b* of the process cartridge B (cross-section taken along line b-b in FIG. 2). FIG. 5 is a cross-sectional view showing a replenishment port 21*c* of the process cartridge B (cross-section taken along line c-c in FIG. 2).

As shown in FIGS. 2, 3, and 4, the process cartridge B includes a cleaning unit 10 (first unit) and a developing unit 15 (second unit). The cleaning unit 10 includes a photosensitive drum 11 as an image bearing member having a cylindrical photosensitive layer. The developing unit 15 includes a developing roller 16 as a developing member for bearing developer (toner).

In addition to the photosensitive drum 11, the cleaning unit 10 includes a cleaning blade 17 as a cleaning member for the photosensitive drum 11, a charging roller 12 as a charging member, and a charging roller cleaner 14 as a cleaning member for the charging roller 12. Furthermore, the cleaning unit 10 includes a primary waste toner storage portion 10*a* and a second waste toner conveyance passage 10*b*.

The charging roller 12 is disposed in contact with the outer circumference surface of the photosensitive drum 11 and charges the photosensitive drum 11 by application of a voltage from a high-voltage power supply (high-voltage power supply 204 in FIG. 18) provided in the printer main body A. The charging roller 12 rotates following the rotation of the photosensitive drum 11.

The cleaning blade 17 is an elastic member that is disposed in contact with the outer circumference surface of the photosensitive drum 11. The distal end of the cleaning blade 17 is elastically in contact with the photosensitive drum 11. Thus, the toner remaining on the photosensitive drum 11 after a sheet S, which is a recording material described below, passes between the photosensitive drum 11 and a transfer roller 104 (FIG. 12) is removed from the photosensitive drum 11 by the cleaning blade 17. The removed toner (waste toner) is conveyed from a first waste toner conveyance passage, which is the primary waste toner storage portion 10*a* described below, to the toner cartridge C through the second waste toner conveyance passage 10*b*.

As shown in FIG. 5, the developing unit 15 includes a developing chamber 151, in which the developing roller 16 is disposed, a developer storage chamber 152, which supplies toner to the developing chamber 151, and a receiving chamber 153, which receives toner supplied from the toner cartridge C.

The developing roller 16 bears toner as a developer bearing member and also supplies toner to the developing zone of the photosensitive drum 11. The developing roller 16 then develops an electrostatic latent image formed on the photosensitive drum 11 using the toner.

A developing blade 18 is in contact with the circumference surface of the developing roller 16 and regulates the amount of toner adhering to the circumference surface of the developing roller 16 as a regulating member. The developing blade 18 also applies a frictional charge to the toner borne on the developing roller 16.

The toner stored in the developer storage chamber 152 is sent to the developing chamber 151 by the rotation of a stirring member 154, and is supplied to the developing roller 16.

Figure 18:
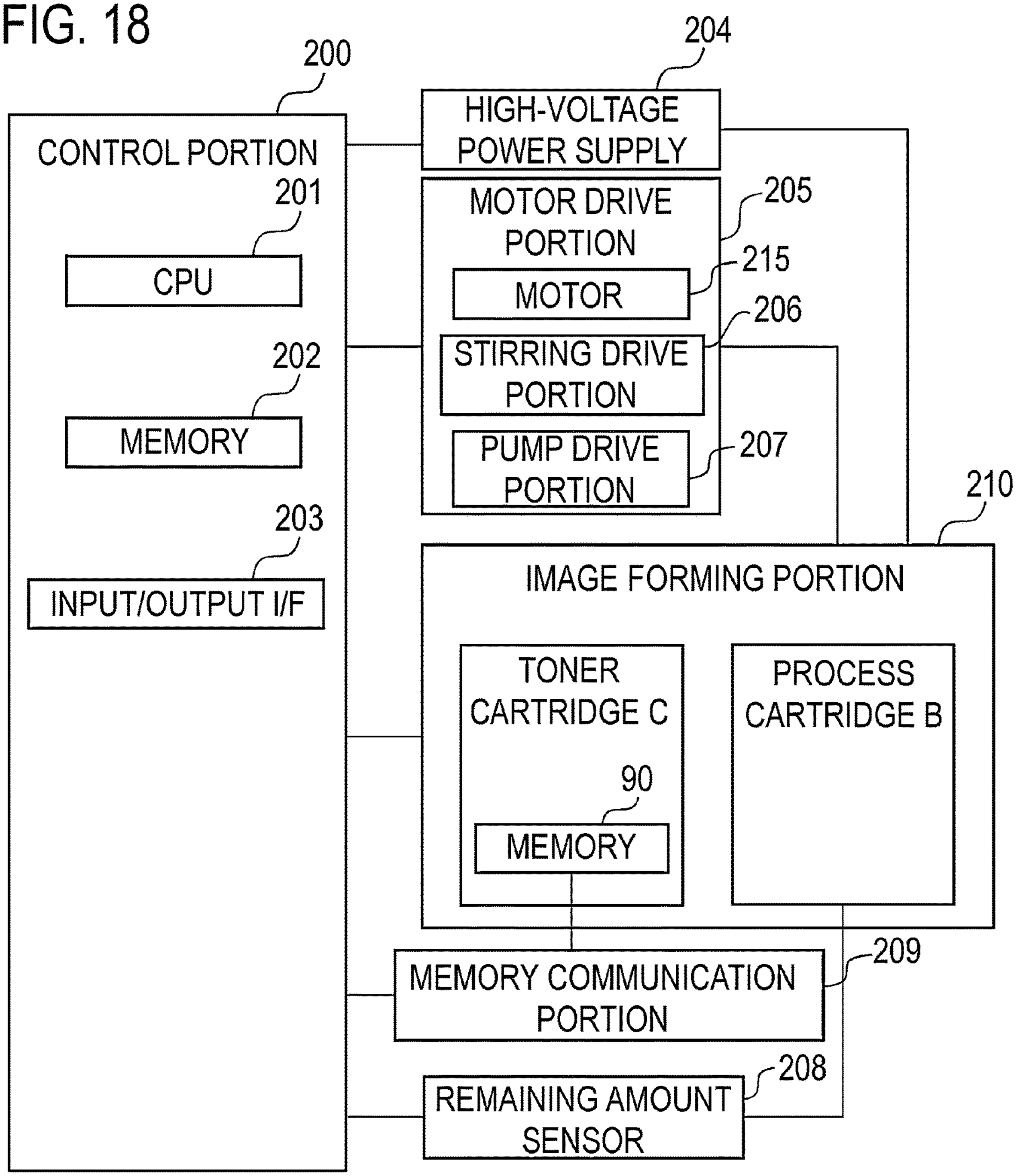
FIG. 18 is a control block diagram of an image forming apparatus according to the present embodiment.

The laser printer 1 of this embodiment includes a unit for detecting the amount of toner remaining in the developer storage chamber 152 (a remaining amount sensor 208 in FIG. 18). The remaining amount detection unit may be a known configuration, such as an optical configuration and a capacitance configuration. When the amount of toner in the developer storage chamber 152 detected by the remaining amount detection unit becomes a predetermined amount or less, toner can be supplied from the toner cartridge C to the process cartridge B. The toner supplied from the toner cartridge C to the process cartridge B is supplied to the developer storage chamber 152 of the developing unit 15 through the replenishment port 21*c* of a stay 21, the receiving chamber 153, and a delivery port 21*d*.

The process cartridge B and the toner cartridge C are attachable to and detachable from the printer main body A, as will be described in detail below.

Referring to FIG. 12, the operation of the laser printer 1 is now described.

The photosensitive drum 11 is driven and rotated by a driving force provided by a motor 215 (FIG. 18) serving as a drive source, and is uniformly charged to a predetermined potential by the charging roller 12. After being charged, the surface of the photosensitive drum 11 is exposed to light using the laser scanner 101 on the basis of image information, and the charge in the exposed area is removed to form an electrostatic latent image. Toner is supplied from the developing roller 16 to the electrostatic latent image on the photosensitive drum 11, and the electrostatic latent image is visualized as a toner image.

Meanwhile, in parallel with the toner image forming operation, a sheet S is conveyed along the sheet feeding portion 103. Specifically, a feeding roller 103*b* rotates and starts feeding the sheet S. Then, the sheet S is conveyed to a nip portion between the photosensitive drum 11 and the transfer roller 104 in time with the formation of a toner image on the photosensitive drum 11. When the sheet S passes through the nip portion, the toner image is transferred from the photosensitive drum 11 to the sheet S as an unfixed image by applying a bias to the transfer roller 104 with a high-voltage power supply 204 (FIG. 18) of the printer main body A.

The sheet S to which the toner image has been transferred is then conveyed to the fixing portion 105. When the sheet S conveyed to the fixing portion 105 passes through the fixing portion 105, the unfixed image is heated and pressed to be fixed to the surface of the sheet S. The sheet S on which the image has been fixed is further conveyed by the sheet feeding portion 103 and discharged to and stacked on a discharge tray 106.

Process Cartridge B Overview

Figure 9A:
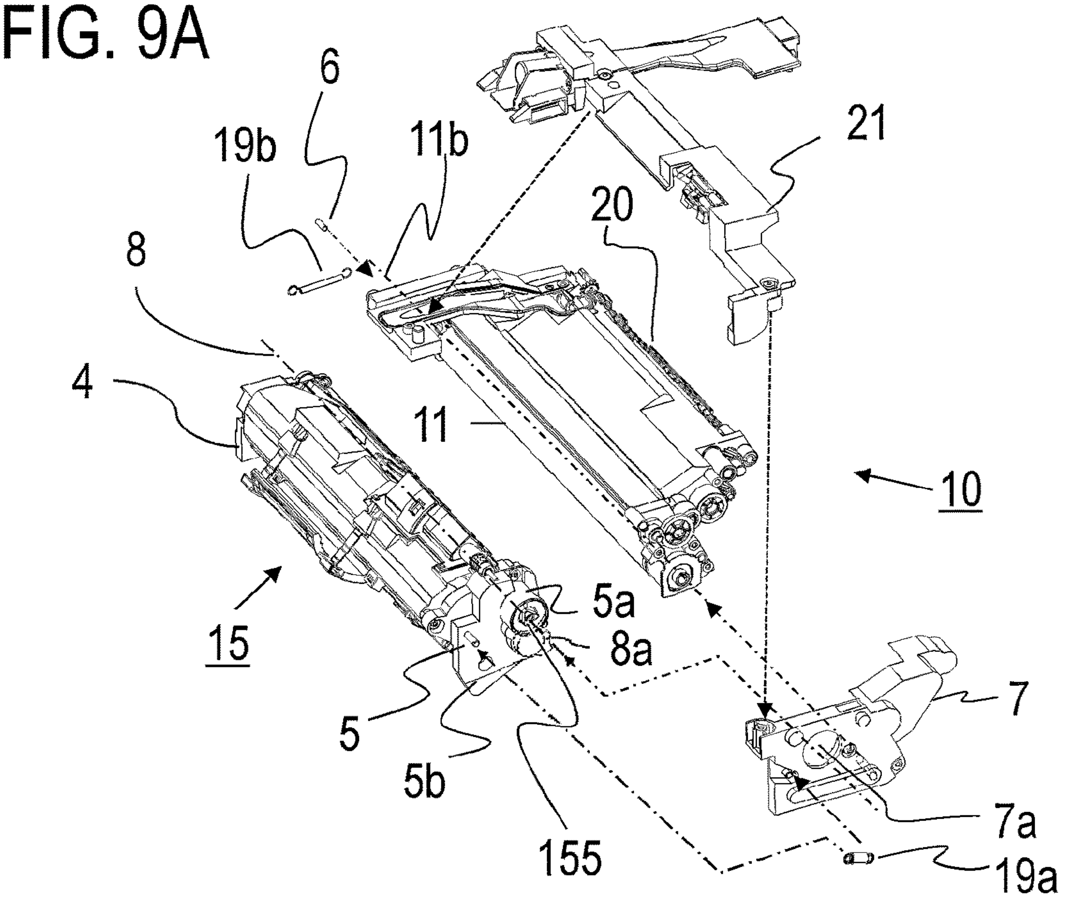
FIGS. 9A and 9B are exploded perspective views of the process cartridge.
Figure 9B:
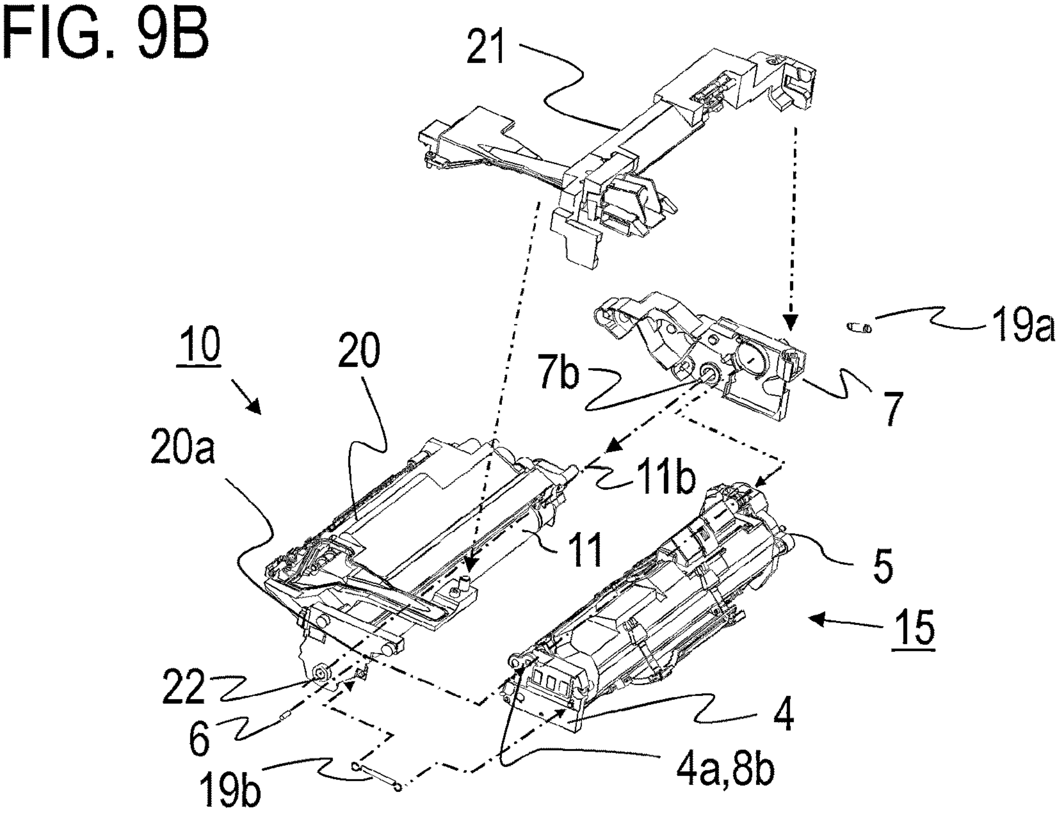
Figure 10A:
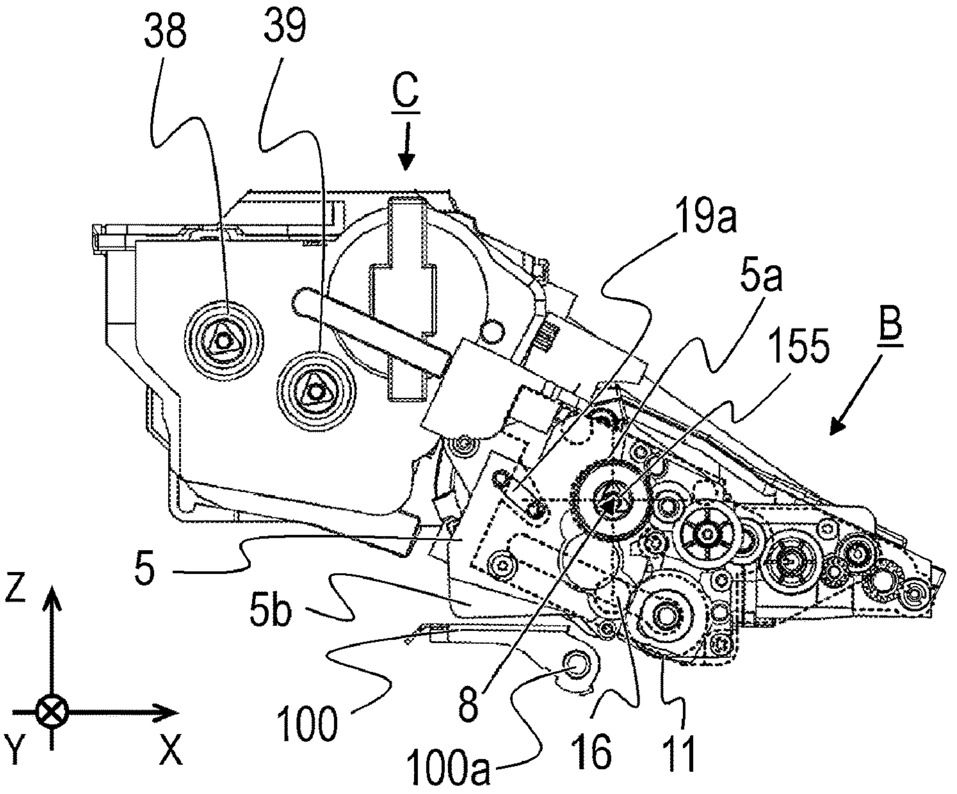
FIGS. 10A and 10B are schematic side views showing states in which a developing unit is in and out of contact with a photosensitive drum.
Figure 10B:
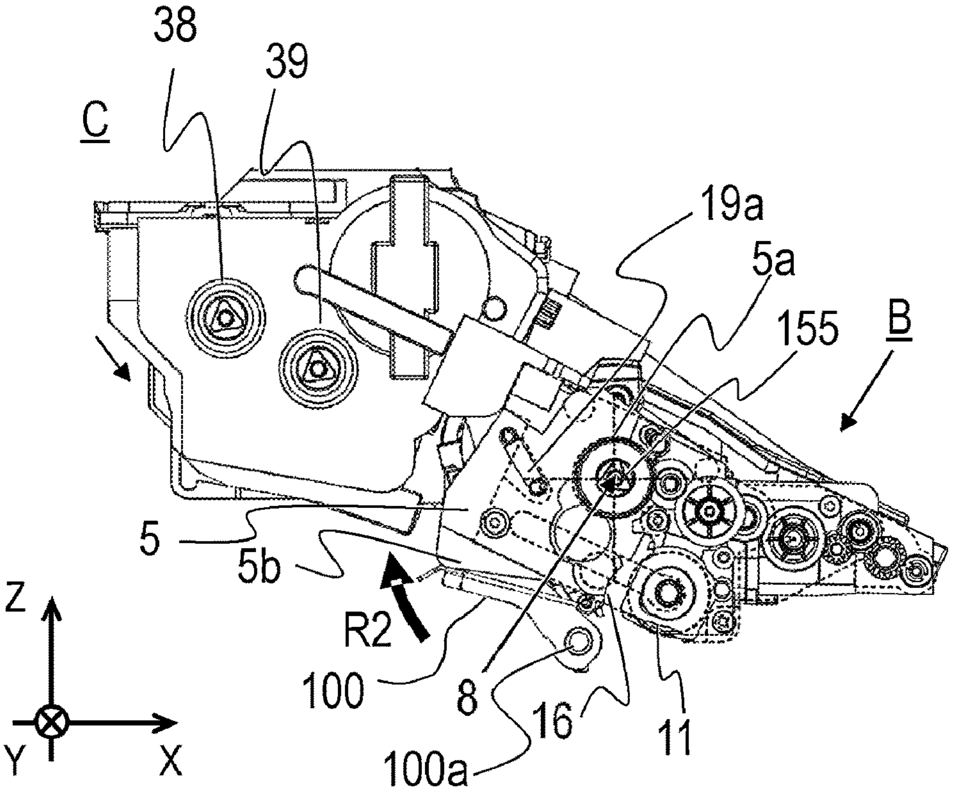

Referring to FIGS. 3, 9A, 9B, 10A and 10B, the configuration of the process cartridge B of the present embodiment is described in detail. FIGS. 9A and 9B are exploded perspective views of the process cartridge B. FIG. 10A is a schematic side view showing a state in which the developing unit 15 is in contact with the photosensitive drum 11 in the process cartridge B. FIG. 10B is a schematic side view showing a state in which the developing unit 15 is spaced apart from the photosensitive drum 11 in the process cartridge B.

As described above, the cleaning unit 10 includes the photosensitive drum 11, the charging roller 12, and the cleaning blade 17. Similarly, the developing unit 15 includes the developing roller 16, the developing blade 18, the developing chamber 151, the developer storage chamber 152, and the receiving chamber 153.

As shown in FIGS. 9A and 9B, the cleaning unit 10 includes a cleaning frame 20, which is a part of a cartridge frame 75, a stay 21, and a side cover 7. The cleaning frame 20 supports the cleaning blade 17, the charging roller 12, and the charging roller cleaner 14. As shown in FIG. 9B, the photosensitive drum 11 is rotatably supported by a drum pin 22, which is attached to the cleaning frame 20, at one side, and by a photosensitive drum support portion 7*b*, which is provided in the side cover 7, at the other side.

As shown in FIGS. 9A and 9B, bearing members 4 and 5 are disposed at the ends of the developing roller 16 in the axial direction. The developing unit 15 is coupled to and supported by the cleaning unit 10 so as to be rotatable about a swing axis 8 defined by a straight line including support axes 8*a* and 8*b*. The swing axis 8 is disposed substantially parallel to the rotation axis 11*b* of the photosensitive drum 11.

As shown in FIG. 9A, a cylindrical portion 5*a* of the bearing member 5, which is a part of the cartridge frame 75, is supported in a cylindrical hole portion 7*a* provided in the side cover 7, which is a part of the cartridge frame 75 of the cleaning unit 10. The support axis 8*a* is defined by the common axis of the cylindrical hole portion 7*a* of the side cover 7 and the cylindrical portion 5*a* of the bearing member 5. Also, a developing coupling 155 is provided at the rotation center of the cylindrical portion 5*a* of the bearing member 5 as a driving input member for receiving drive from the printer main body A.

Also, as shown in FIG. 9B, a pin 6 is inserted so as to extend in a cylindrical hole portion 20*a* of the cleaning frame 20 of the cleaning unit 10 and a cylindrical hole 4*a* of the bearing member 4. The support axis 8*b* is defined by the common axis of the pin 6 and the cylindrical hole 4*a* of the bearing member 4. The support axes 8*a* and 8*b* are disposed substantially coaxially, and as described above, the swing axis 8 is defined by a straight line including the support axes 8*a* and 8*b*.

As described above, the developing unit 15 is supported rotatably about the swing axis 8 relative to the cleaning unit 10. The developing unit 15 is urged toward the photosensitive drum 11 of the cleaning unit 10 by pressure springs 19*a* and 19*b*, which are elastic members, so that the developing roller 16 is in contact with the photosensitive drum 11.

Referring to FIGS. 10A and 10B, the operations of the developing unit 15 coming into and out of contact with the cleaning unit 10 are now described. FIGS. 10A and 10B are explanatory diagrams in which the side cover 7 is omitted to show a spacing mechanism 100 of the printer main body A.

As shown in FIG. 10A, the bearing member 5 includes a protruding portion 5*b*. As shown in FIG. 10A, when the protruding portion 5*b* is not in contact with the spacing mechanism 100, the developing roller 16 is in contact with the photosensitive drum 11 by the urging forces of the pressure springs 19*a* and 19*b*. The relative position between the photosensitive drum 11 and the developing roller 16 (or the position of the developing unit) in this state is an image forming position where the developing roller 16 develops the electrostatic latent image formed on the surface of the photosensitive drum 11.

As shown in FIG. 10B, when the spacing mechanism 100 provided in the printer main body A swings about a swing shaft 100*a* and comes into contact with the protruding portion 5*b*, the protruding portion 5*b* receives force from the spacing mechanism 100. This rotates the developing unit 15 in the direction of arrow R2 about the swing axis 8 as the rotation center. As a result, the developing roller 16 is spaced apart from the photosensitive drum 11 overcoming the urging forces of the pressure springs 19*a* and 19*b*. The relative position between the photosensitive drum 11 and the developing roller 16 (or the position of the developing unit) in this state is a non-image forming position retracted from the image forming position.

When the spacing mechanism 100 returns from the position in FIG. 10B (spaced-apart position, non-image forming position) to the original position in FIG. 10A (contact position, image forming position), the spacing mechanism 100 is separated from the protruding portion 5*b*. Then, the urging forces of the pressure springs 19*a* and 19*b* bring the developing roller 16 into contact with the photosensitive drum 11 again. That is, the spacing mechanism 100 allows the position of the developing unit to be switched between the contact position (image forming position) and the spaced-apart position (non-image forming position). This allows the orientation of the developing unit 15 in the process cartridge B to be switched between a contact position and a spaced-apart position with respect to the photosensitive drum 11. This limits toner degradation and unnecessary toner consumption when no image is formed.

Toner Cartridge C Overview

Figure 6:
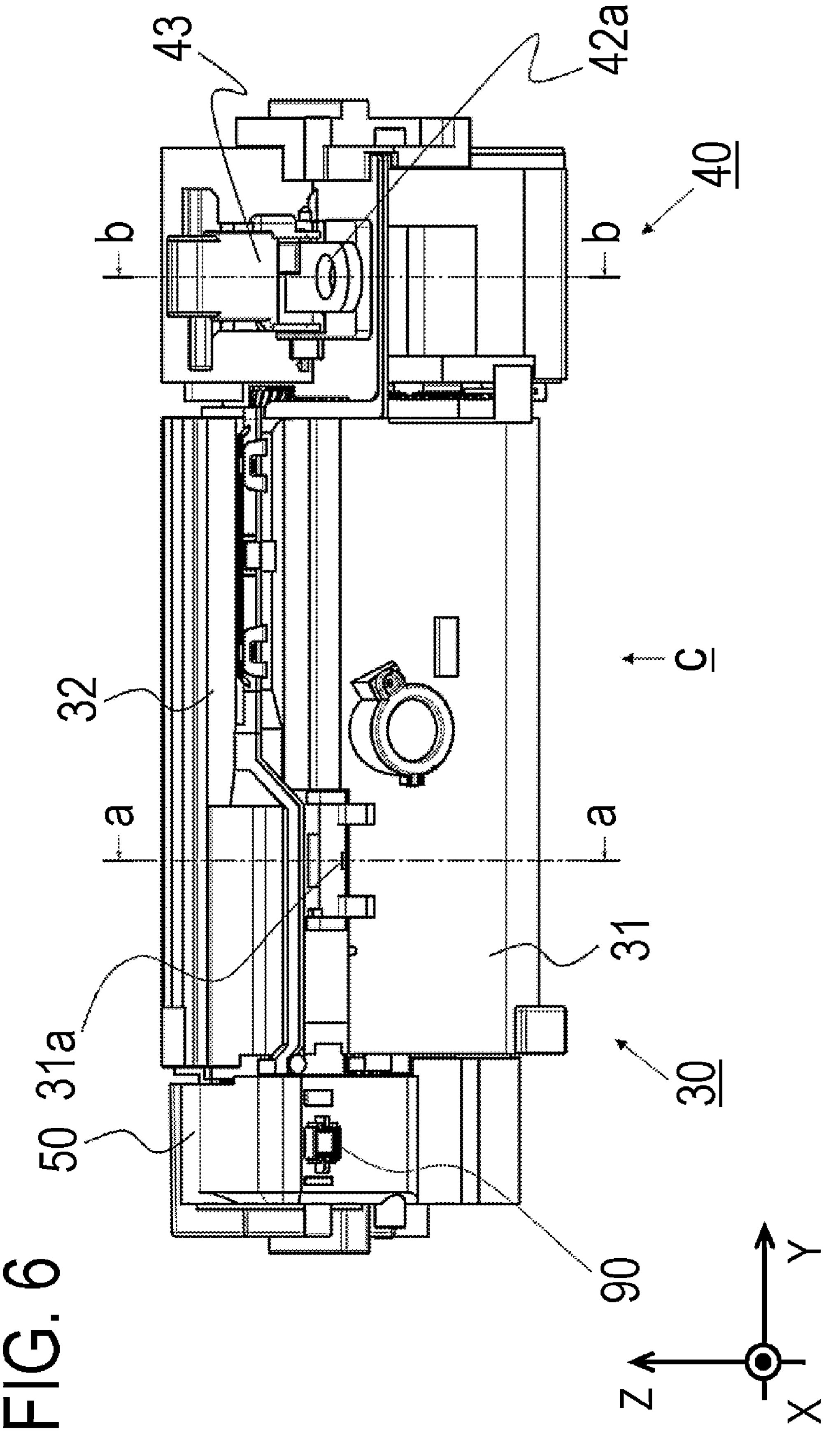
FIG. 6 is a front view showing an outline of a toner cartridge.
Figure 7:
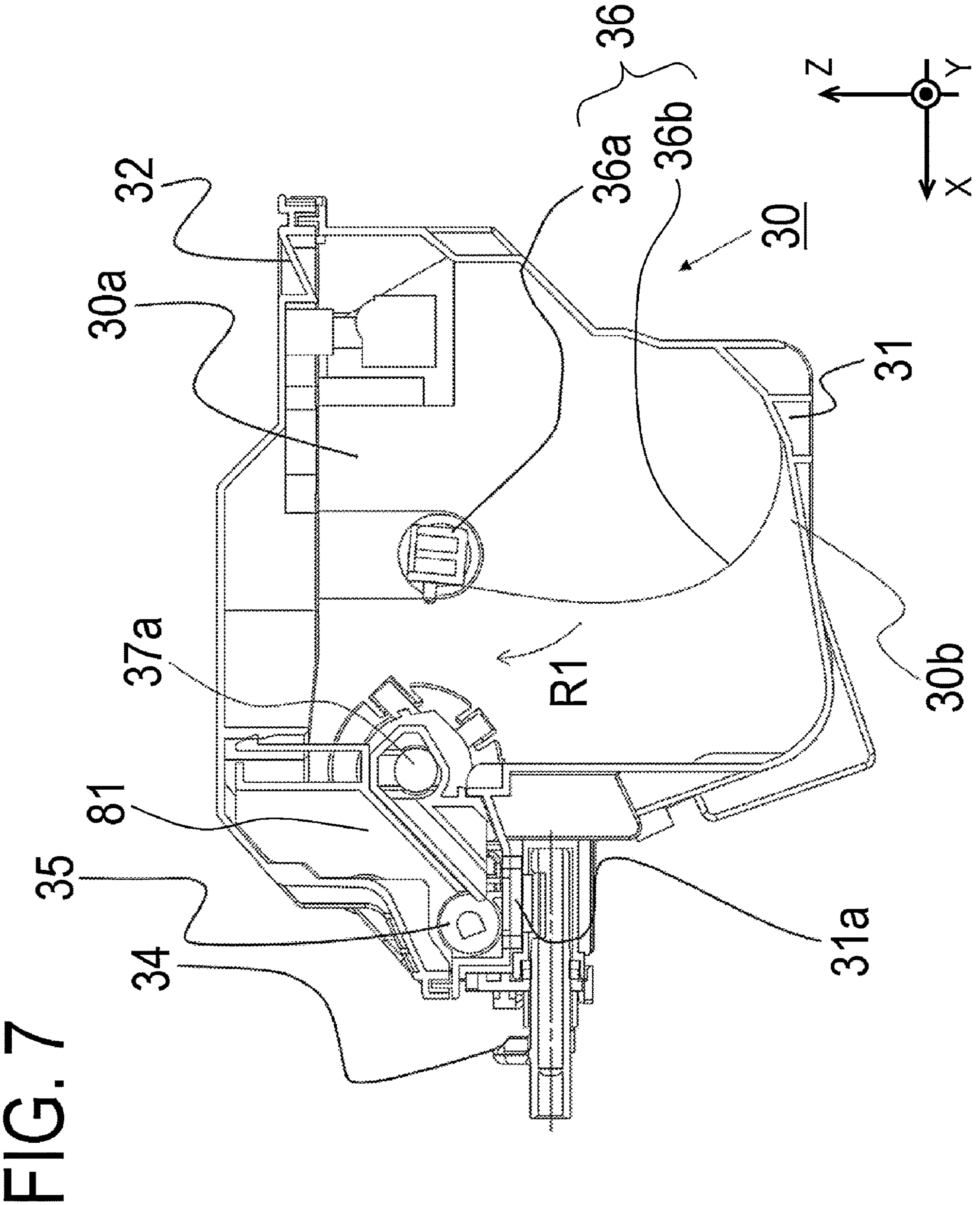
FIG. 7 is a cross-sectional view showing a toner supply portion of the toner cartridge.
Figure 8:
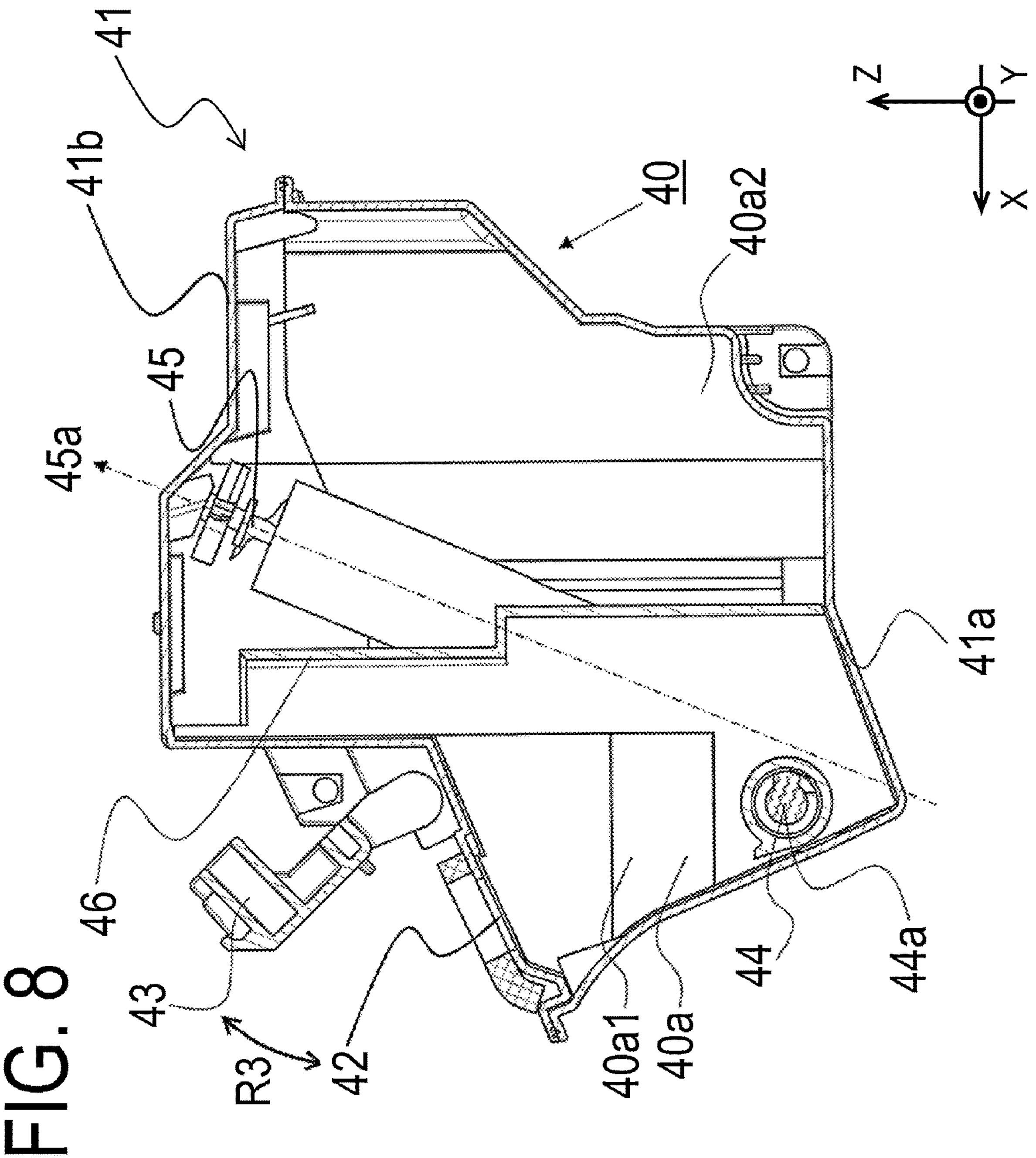
FIG. 8 is a cross-sectional view showing a waste toner storage portion of the toner cartridge.
Figure 11A:
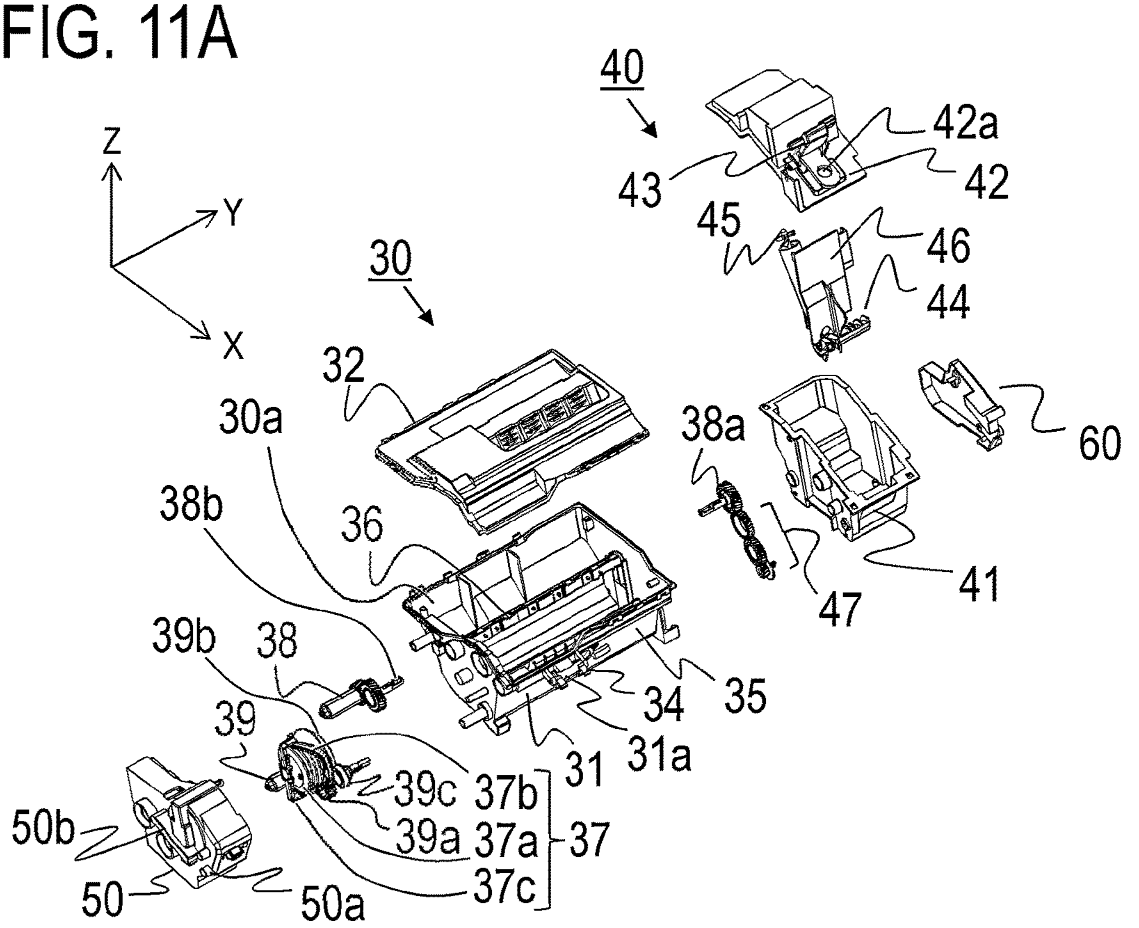
FIGS. 11A and 11B are exploded perspective views of the toner cartridge.
Figure 11B:
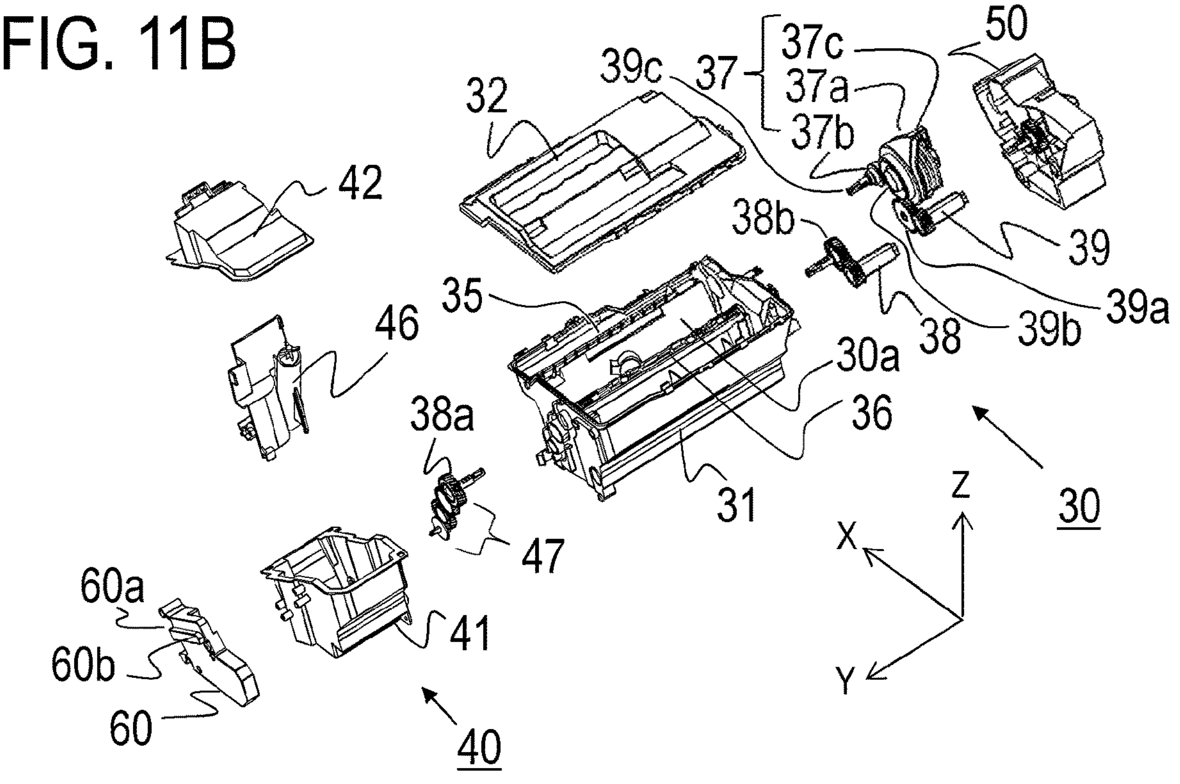

Referring to FIGS. 6, 7, 8, 11A, and 11B, a toner cartridge C is now described. FIG. 6 is a front view showing the outline of the toner cartridge C. FIG. 7 is a cross-sectional view showing a toner supply portion 30 of the toner cartridge C (cross-section taken along line a-a in FIG. 6). FIG. 8 is a cross-sectional view showing a waste toner storage portion 40 of the toner cartridge C (cross-section taken along line b-b in FIG. 6). FIGS. 11A and 11B are exploded perspective views of the toner cartridge C.

As shown in FIG. 6, the longitudinal direction of the toner cartridge C is defined as the longitudinal direction (arrow Y). The longitudinal direction is perpendicular to the horizontal direction (arrow X) and the vertical direction (arrow Z) shown in FIG. 7. Also, the horizontal direction and the vertical direction are collectively defined as a transverse direction.

Toner Supply Portion

As shown in FIG. 6, the toner cartridge C includes the toner supply portion 30, which supplies toner to the process cartridge B, and the waste toner storage portion 40, which collects waste toner from the process cartridge B.

As shown in FIGS. 6, 7, 11A, and 11B, the toner supply portion 30 includes a supply portion frame 31 and a supply portion lid 32. The supply portion frame 31 and the supply portion lid 32 form the toner storage portion 30*a*. The supply portion frame 31 has a toner discharge port 31*a*. The toner stored in the toner storage portion 30*a* is discharged from the toner storage portion 30*a* through the toner discharge port 31*a*. The toner discharged from the toner discharge port 31*a* is supplied to the process cartridge B. A shutter member 34 is provided on the outside of the supply portion frame 31. The shutter member 34 is configured to open and close the toner discharge port 31*a* in conjunction with the attachment of the toner cartridge C.

The toner storage portion 30*a* includes a toner storage portion screw member (hereinafter, screw member) 35 and a toner storage portion stirring and conveying member (hereinafter, stirring member) 36.

The screw member 35 is a conveying member for conveying toner in the longitudinal direction of the toner storage portion 30*a* toward the toner discharge port 31*a*. The screw member 35 includes a rotation shaft and a blade portion, which extends helically on the outer circumference surface of the rotation shaft. The blade portion of the screw member 35 is configured such that the rotation of the screw member 35 can cause the toner around the blade portion to form a toner flow that moves in the longitudinal direction of the toner storage portion 30*a*.

The stirring member 36 is a conveying member for conveying toner toward the screw member 35. The stirring member 36 includes a rotation shaft 36*a* and a stirring portion 36*b*, which is a flexible sheet-shaped member. The rotation shaft 36*a* is configured to be rotatable about a rotation axis extending in the longitudinal direction (Y direction) of the toner storage portion 30*a*. One end side of the stirring portion 36*b* is attached to the surface of the rotation shaft 36*a* along the rotation axis, and extends over substantially the entire area in the longitudinal direction of the toner storage portion 30*a*. The other end side (free end side) of the stirring member 36 opposite to the one end side (fixed end side) is in contact with the inner wall surfaces of the supply portion frame 31 and the supply portion lid 32, which form the toner storage portion 30*a*. As the rotation shaft 36*a* rotates, the stirring portion 36*b* moves around the rotation axis of the rotation shaft 36*a* while its end portion side (free end side), which is away from the fixed portion fixed to the rotation shaft 36*a*, slides in contact with the inner wall surfaces of the supply portion frame 31 and the supply portion lid 32, which form the toner storage portion 30*a*. As a result, the toner in the toner storage portion 30*a* is pushed toward the region of the toner storage portion 30*a* in which the screw member 35 is disposed. The toner conveyed to the toner discharge port 31*a* by the stirring and conveying action of the screw member 35 and the stirring member 36 is discharged from the toner discharge port 31*a* by the volumetric fluctuation of a pump 37*a*. The pump 37*a* is provided integrally with the toner storage portion 30*a* so as to form a toner storage space (more specifically, a discharge chamber 81) in the toner cartridge C together with the toner storage portion 30*a*.

Specifically, as shown in FIG. 11A, the toner cartridge C includes a pump unit 37. The pump unit 37 includes the pump 37*a*, a cam 37*b*, and a link arm 37*c*. The pump 37*a* is configured to be capable of varying the volume by expanding and contracting in the longitudinal direction (Y direction). The cam 37*b* is arranged coaxially with the pump 37*a* so as to be rotatable. The link arm 37*c* is guided linearly in the longitudinal direction by the rotation of the cam 37*b*, thereby causing the pump 37*a* to expand and contract in the longitudinal direction.

The interior of the toner storage portion 30*a* is partitioned into a storage chamber 30*b*, in which the stirring member 36 is disposed, and a discharge chamber 81, which includes the toner discharge port 31*a*, in a manner that enables communication between them. The partition separating the storage chamber 30*b* and the discharge chamber 81 includes a partition 313 shown in FIG. 15.

The screw member 35 is configured to be capable of forming a toner flow in which the toner moves from the storage chamber 30*b* to the discharge chamber 81 by rotating in the forward rotation direction during the image forming operation. The toner in the storage chamber 30*b* is conveyed toward the screw member 35 by the rotation of the stirring member 36, and is conveyed from the storage chamber 30*b* toward the discharge chamber 81 by the rotation of the screw member 35. At the same time, the volume of the discharge chamber 81 changes due to the expansion and contraction of the pump 37*a*, thereby discharging the toner inside the discharge chamber 81 from the toner discharge port 31*a*. The toner discharged from the toner discharge port 31*a* is supplied to the receiving chamber 153 of the process cartridge B.

Waste Toner Storage Unit

As shown in FIG. 8, the waste toner storage portion 40 includes a waste toner receiving port 42 for receiving waste toner from the process cartridge B, and a waste toner storage container 41 as a second storage container in which the waste toner received from the waste toner receiving port 42 is stored.

The waste toner storage container 41 is formed by a waste toner storage portion frame 41*a*, which includes the waste toner storage portion 40, and a waste toner storage lid 41*b*. The waste toner storage lid 41*b* has the waste toner receiving port 42 for receiving the waste toner collected from the process cartridge. The waste toner storage lid 41*b* includes a waste toner shutter member 43, which opens and closes the waste toner receiving port 42. The waste toner shutter member 43 opens and closes in the directions of arrow R3 in FIG. 8 in conjunction with the attachment and detachment of the toner cartridge C with respect to the printer main body A.

As shown in FIGS. 8 and 11A, the waste toner storage portion 40 includes a partition member 46, a first waste toner storage screw 44 as a waste toner conveying member for conveying the waste toner in the waste toner storage portion 40, and a second waste toner storage screw 45. The partition member 46 divides the space inside the waste toner storage portion 40 into a plurality of storage portions (40*a*1, 40*a*2). The first waste toner storage screw 44 conveys the waste toner that has fallen from the waste toner receiving port 42 in the longitudinal direction of the toner cartridge C. The second waste toner storage screw 45 is driven by the first waste toner storage screw 44 and conveys the waste toner conveyed by the first waste toner storage screw 44 obliquely upward. The first waste toner storage screw 44 rotates about a rotation axis 44*a*, which is parallel to the longitudinal direction of the toner cartridge C (Y direction). The second waste toner storage screw 45 rotates about a rotation axis 45*a* extending in a direction perpendicular to the longitudinal direction of the toner cartridge C (Y direction).

As shown in FIGS. 11A and 11B, the driving force input from a stirring driving input gear 38 is transmitted through the stirring member 36 to a non-drive-side gear 38*a* provided on the non-drive side of the toner supply portion 30. The driving force is then transmitted from the non-drive-side gear 38*a* to the first waste toner storage screw 44 through a waste toner storage portion gear train 47. A drive-side toner cartridge side cover 50 is attached to the side corresponding to the toner supply portion 30, and a non-drive-side driven toner cartridge side cover 60 is attached to the side corresponding to the waste toner storage portion 40.

With the above-described configuration, the stirring driving input gear 38 can be driven even when a pump/screw driving input gear 39 is not driven. In other words, even when the toner supply portion 30 is not replenishing toner to the process cartridge B, the first and second waste toner storage screws 44 and 45 in the waste toner storage portion 40 can be driven to maintain a state in which waste toner can be collected.

Furthermore, since the driving force from the printer main body A can be input to one end of the toner cartridge C, the gear train of the printer main body A can be simplified. Moreover, by using the stirring member 36 to transmit drive from one end of the supply portion frame 32*a* to the other end, the drive can be transmitted to the waste toner storage portion 40 without increasing the number of parts for drive transmission. This allows waste toner to be stored in the toner cartridge C while limiting an increase in size of the toner cartridge C and the printer main body A in the direction of the rotation axis of the photosensitive drum 11 due to the drive unit of the toner cartridge C.

Drive Configuration of Toner Supply Portion

Figure 13:
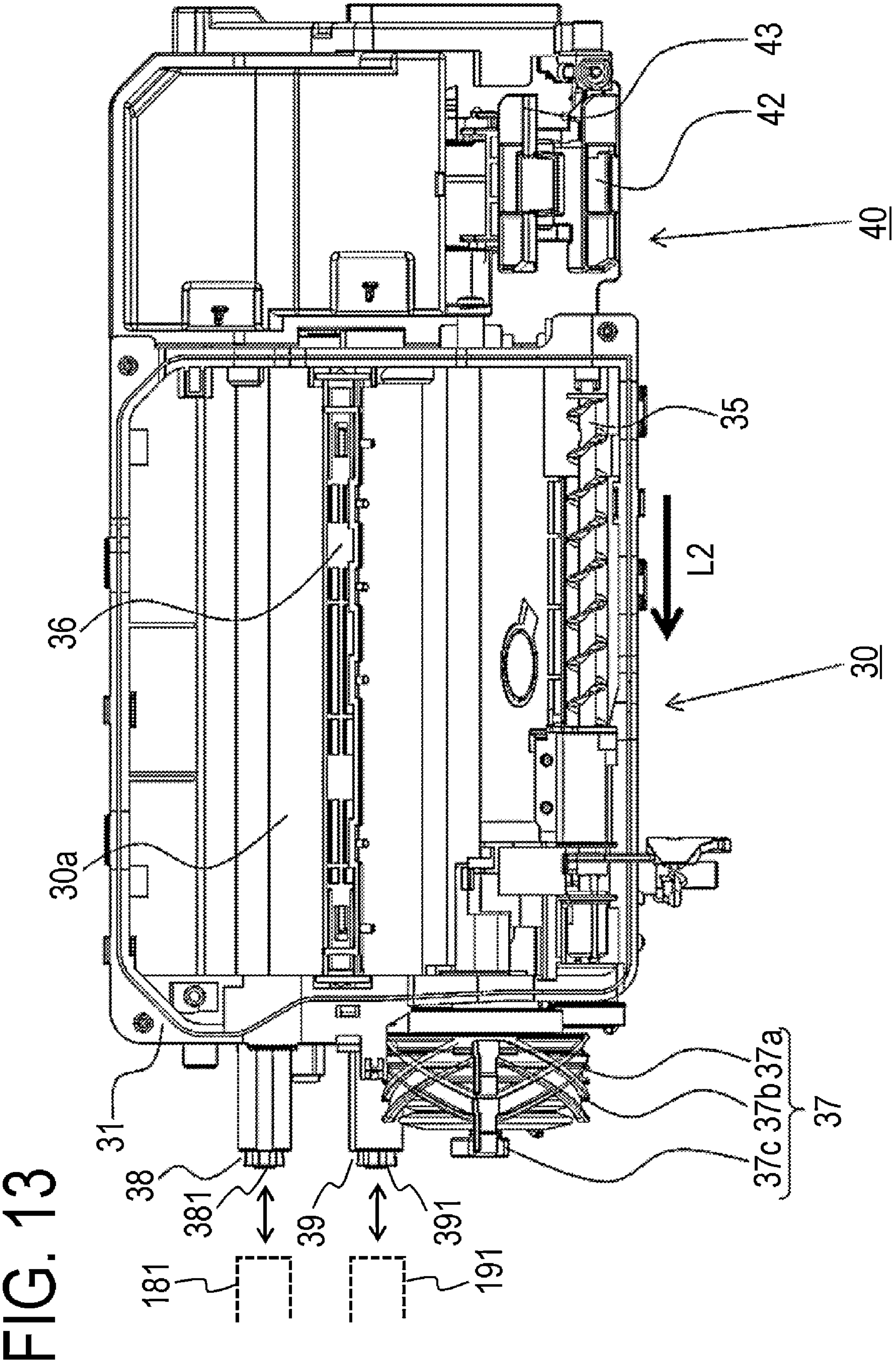
FIG. 13 is a top view showing the arrangement of a pump unit of a toner cartridge.
Figure 14:
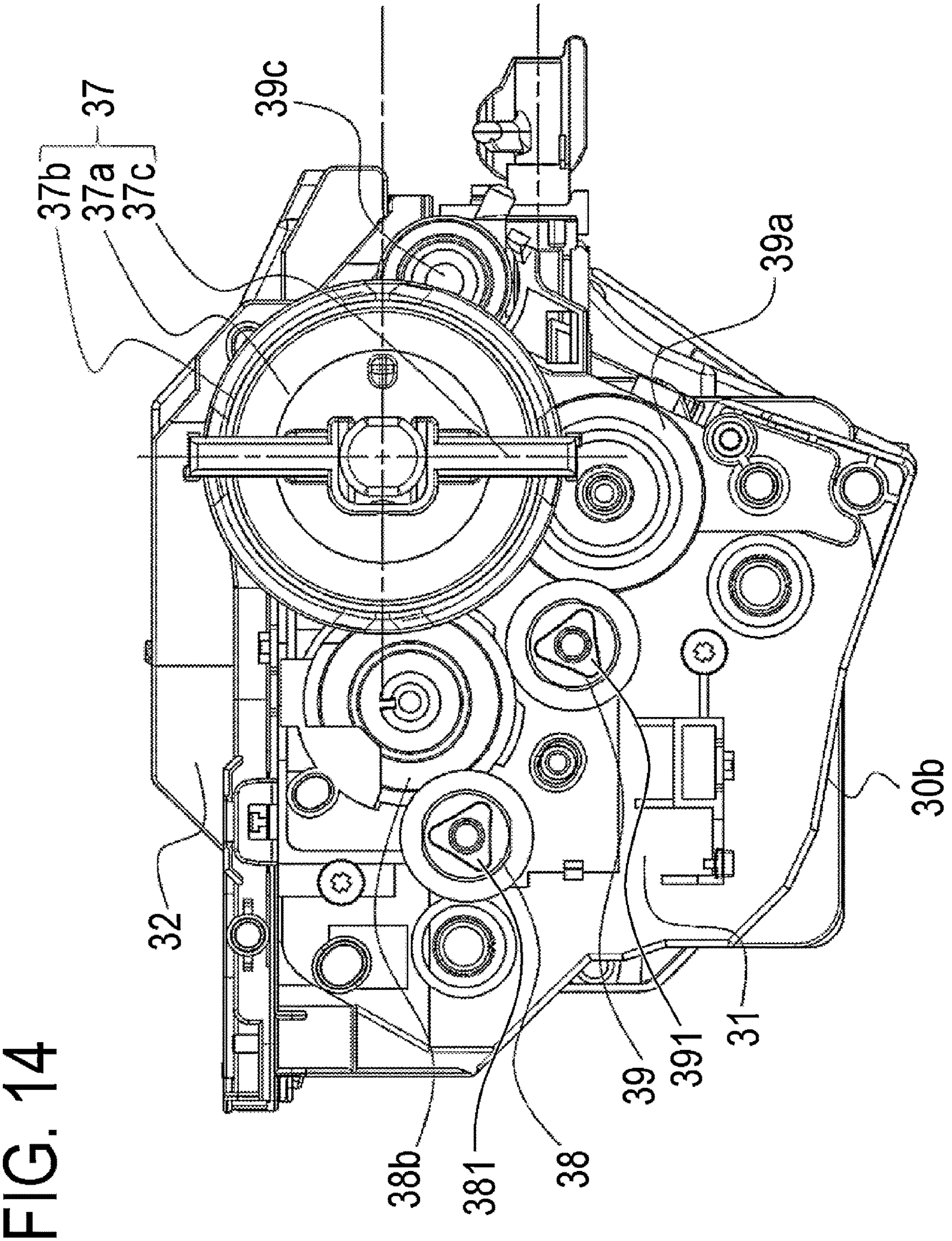
FIG. 14 is a side view showing the arrangement of the pump unit of the toner cartridge.
Figure 15:
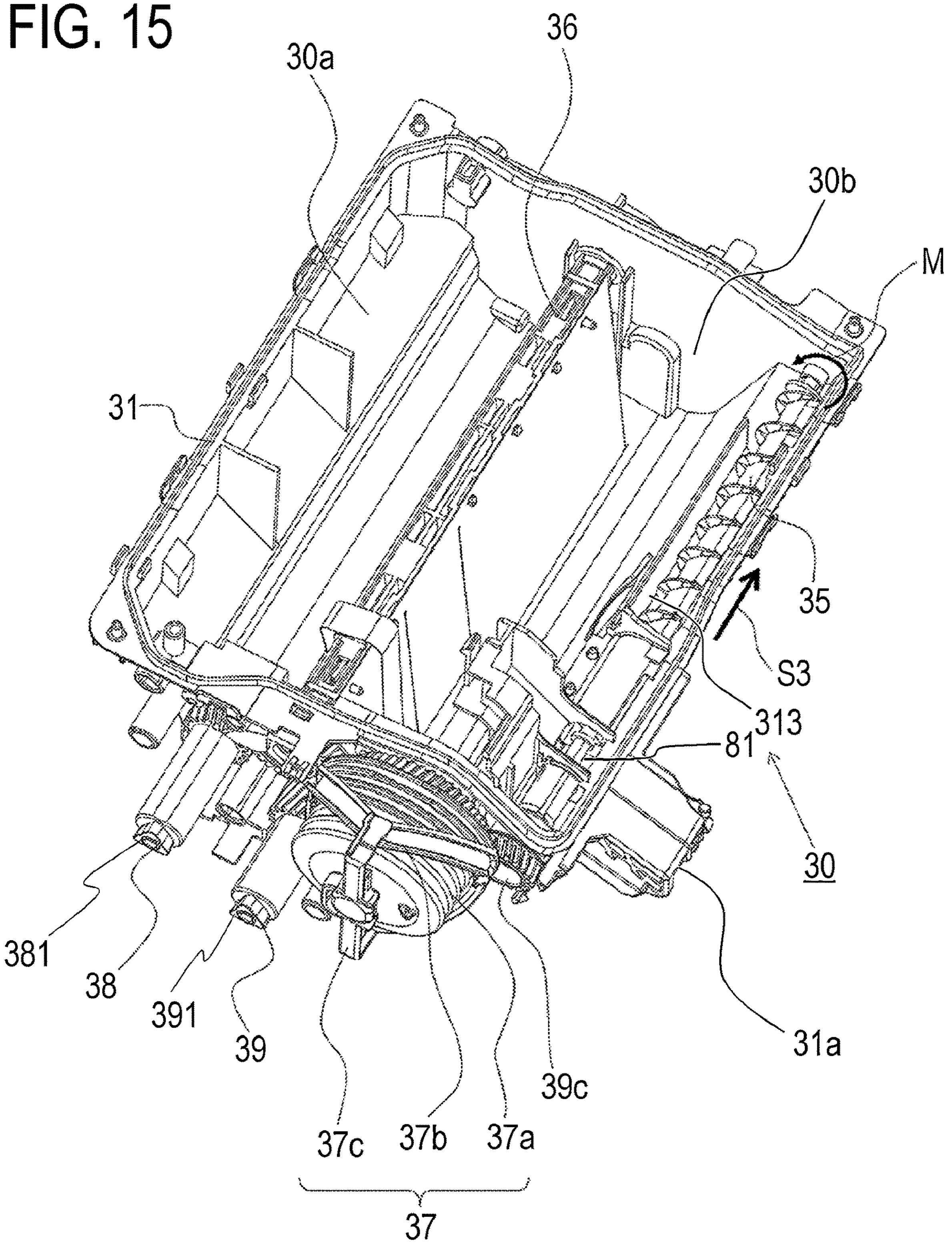
FIG. 15 is a perspective view showing the arrangement of the pump unit of the toner cartridge.

Referring to FIGS. 7, 11A, 11B, 13, 14, and 15, the drive configuration of the toner supply portion 30 is described. FIGS. 13, 14, and 15 show the arrangement of the pump unit of the toner cartridge, with FIG. 13 being a top view, FIG. 14 being a side view, and FIG. 15 being a perspective view.

As shown in FIGS. 11A, 11B, 13, 14, and 15, the toner supply portion 30 has the stirring driving input gear 38 and the pump/screw driving input gear 39. The stirring driving input gear 38 includes a cartridge-side coupling 381 and is a stirring driving input portion that receives a driving force that drives the stirring member 36 from the printer main body A. The pump/screw driving input gear 39 includes a cartridge-side coupling 391 and is a pump driving input portion that receives a driving force that drives the pump unit 37 and the screw member 35 from the printer main body A. The stirring driving input gear 38 and the pump/screw driving input gear 39 are disposed on one longitudinal end side of the toner cartridge C.

A stirring gear 38*b* for transmitting a rotational driving force to the stirring member 36 is provided next to the stirring driving input gear 38 and coaxially with the stirring member 36. The stirring gear 38*b* receives a driving force from the stirring driving input gear 38 and rotates the stirring member 36 in the R1 direction in FIG. 7, thereby stirring the toner in the toner storage portion 30*a* and conveying the toner toward the screw member 35.

A cam drive gear 39*a*, which rotates by receiving a driving force from the pump/screw driving input gear 39, is provided next to the pump/screw driving input gear 39. A cam gear 39*b*, which rotates by receiving a driving force from the cam drive gear 39*a*, is provided next to the cam drive gear 39*a*. The cam gear 39*b* is formed integrally with the cam 37*b* and therefore guides the link arm 37*c* linearly in the longitudinal direction as the pump/screw driving input gear 39 rotates. With this configuration, the pump can be expanded and contracted by driving and rotating the cam gear 39*b*. A toner storage portion screw drive gear 39*c*, which transmits a rotational driving force to the screw member 35, is provided next to the cam gear 39*b* and coaxially with the screw member 35.

The printer main body A includes a stirring drive portion 206 (first drive portion) for driving the stirring driving input gear 38 and a pump drive portion 207 (second drive portion) for driving the pump/screw driving input gear 39 (FIG. 18).

As shown in FIG. 13, the attachment portion of the printer main body A with respect to the toner cartridge C includes a main-body-side coupling 181, which is a part of the stirring drive portion 206, and a main-body-side coupling 191, which is a part of the pump drive portion 207. When the toner cartridge C is attached to the printer main body A, the cartridge-side coupling 381 of the toner cartridge C engages with the main-body-side coupling 181, allowing the driving force of the motor 215 (FIG. 18) of the printer main body A to be input to the stirring driving input gear 38. That is, the main-body-side coupling 181 forms a part of the first drive portion that provides the toner cartridge C with a driving force (first driving force) that drives the stirring member 36.

Similarly, when the toner cartridge C is attached to the printer main body A, the cartridge-side coupling 391 of the toner cartridge C engages with the main-body-side coupling 191, allowing the motor driving force of the printer main body A to be input to the pump/screw driving input gear 39. That is, the main-body-side coupling 191 forms a part of the second drive portion that provides the toner cartridge C with a driving force (second driving force) that drives the screw member 35 and the pump unit 37.

In FIG. 13, the cartridge-side coupling 381 and the main-body-side coupling 181, which form a part of the drive train that drives the stirring member 36, are shown separated from each other in the longitudinal direction.

The toner storage portion screw drive gear 39*c* receives a driving force from the cam gear 39*b* and rotates the screw member 35, thereby conveying the toner in the toner storage portion 30*a* in the longitudinal direction (the direction of arrow L2 in FIG. 13) toward the toner discharge port 31*a*. That is, the conveying action of the blade portion of the screw member 35 to move the toner in the longitudinal direction toward the toner discharge port 31*a* occurs when the pump/screw driving input gear 39 rotates forward.

Sealing Member

Figure 16:
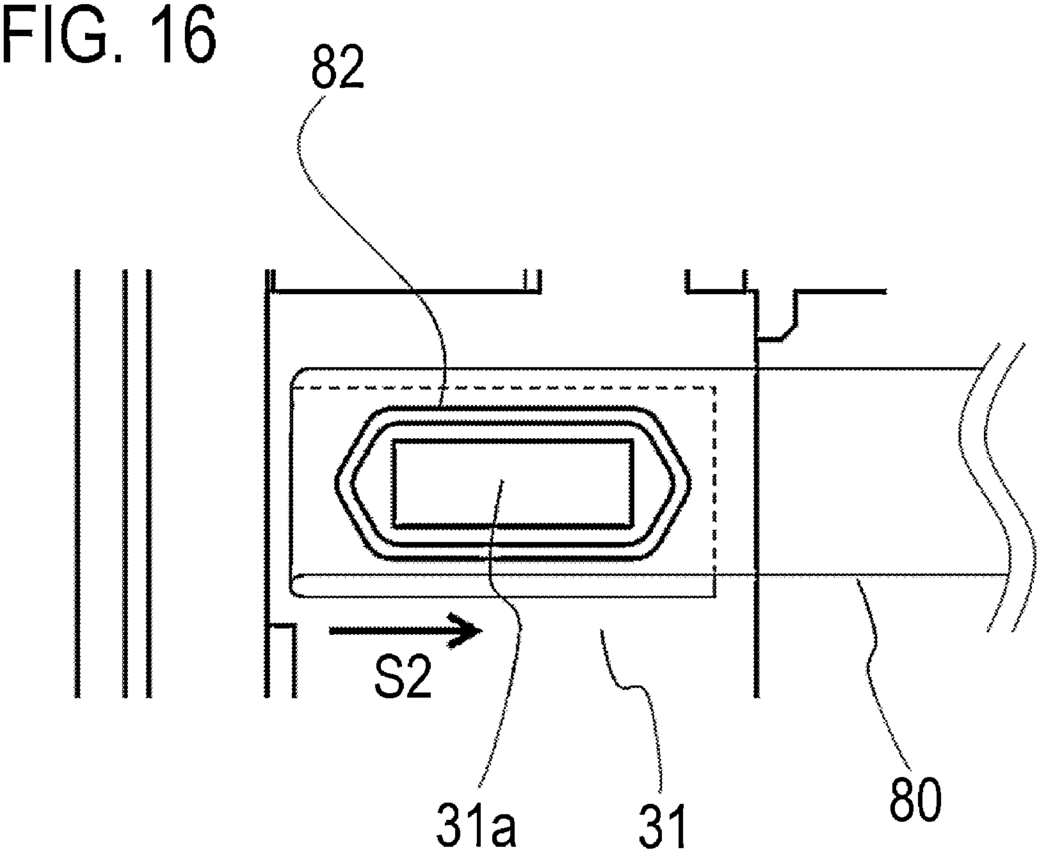
FIG. 16 is a detailed view of a weld shape of a sealing member.

Referring to FIGS. 7, 16, and 17A to 17D, the configuration of the sealing member 80 is now described. FIG. 16 is a detailed view showing the heat weld portion of the sealing member 80, and FIGS. 17A to 17D are schematic cross-sectional views of the toner cartridge C showing the process of peeling off the sealing member 80.

Figure 17A:
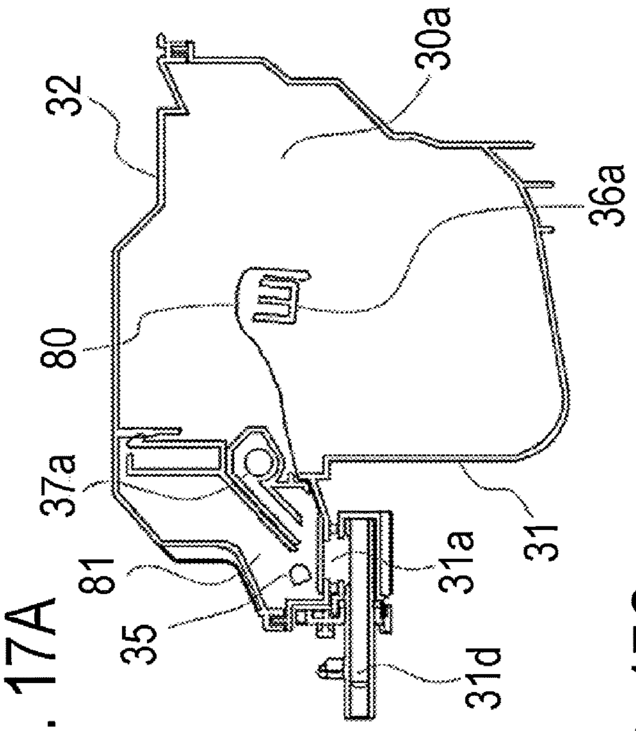
FIGS. 17A to 17D are cross-sectional views of a developer replenishment cartridge showing the process of peeling off the sealing member.

As shown in FIGS. 16 and 17A, one end portion of the sealing member 80 is heat-welded with a peelable strength around the toner discharge port 31*a* on the inner wall surfaces of the supply portion frame 31 and supply portion lid 32, which form the toner storage portion 30*a*, thereby sealing the toner discharge port 31*a* in an openable manner. A weld portion 82 is located at one end of the sealing member 80, has a hexagonal shape, and forms a sealing portion together with the part of the sealing member 80 inside the weld portion 82. Since peeling begins from an apex of the hexagon, the area of welding in the section where peeling begins is small, requiring a smaller force for peeling.

The other end of the sealing member 80 serves as a fixed portion and is fixed to the shaft 36*a* of the stirring member 36, which is driven and rotated, by a means such as heat welding. Here, the sealing member 80 is folded back near the toner discharge port 31*a*, and is peeled off from the side farthest from the other end. This allows the sealing member 80 to be peeled off with a small force. The sealing member 80 is made of a laminate of polyester, low density polyethylene, and a polyethylene sealant. The sealing member 80 may also be made of other materials having similar properties.

In this embodiment, the other end of the sealing member 80 and the shaft 36*a* of the stirring member 36 are fixed to each other by thermal welding. However, there is no limitation to this, and other means such as adhesion, double-sided tape, or engagement between a hole and a projection may also be used.

Control Configuration

Referring to FIG. 18, the control configuration of the laser printer 1 is now described. FIG. 18 is a control block diagram of the laser printer 1.

A control portion 200 includes a central processing unit (CPU) 201, which is a central element for performing calculation processing, a memory 202, which is a storage unit such as a ROM or RAM, and an input/output I/F 203, which inputs and outputs information to and from peripheral devices. The RAM stores the results of sensor detection and calculations, while the ROM stores the control program, pre-calculated data tables, and the like.

The control portion 200 is a control unit that comprehensively controls the operation of the laser printer 1, and each control target in the laser printer 1 is connected to the control portion 200 via the input/output I/F 203. The control portion 200 controls the transmission and reception of various electrical information signals, drive timings, and the like, and controls the flowchart processing described below.

A motor drive portion 205 refers to a drive configuration including a motor as a drive source, a drive train that transmits the driving force of the motor to each part of an image forming portion 210, and the like. The motor is a drive source for rotating and driving each member included in the image forming portion 210, such as the laser scanner 101, the photosensitive drum 11, and the developing roller 16, and operates on the basis of a control signal from the control portion 200.

The motor drive portion 205 includes the stirring drive portion 206 and the pump drive portion 207. The stirring drive portion 206 is a drive portion that drives the stirring member 36. The stirring drive portion 206 includes, as a drive portion configuration (first drive portion) on the side corresponding to the printer main body A, the main-body-side coupling 181 that engages with the cartridge-side coupling 381 of the toner cartridge C (FIG. 13). The pump drive portion 207 is a drive portion that drives the screw member 35 and the pump unit 37. The pump drive portion 207 includes, as a drive portion configuration of the side corresponding to the printer main body A, the main-body-side coupling 191 that engages with the cartridge-side coupling 391 of the toner cartridge C (FIG. 13).

The high-voltage power supply 204 is a power supply that applies a high voltage to the photosensitive drum 11, the charging roller 12, the developing roller 16, the transfer roller 104, the fixing portion 105, and the like.

Furthermore, data communication is performed between the control portion 200 and the memory 90 via a memory communication portion 209. The control portion 200, the memory 90, the memory communication portion 209, and the like form a new-product detection unit that detects whether the toner cartridge C is new (unused).

Here, new refers to an initial state before use. Alternatively, it refers to a state in which the toner stored in the toner cartridge C has not been used yet. Furthermore, when the control portion 200 determines whether the toner cartridge C attached to the printer main body A is in an initial state, the determination is not limited to a mode in which the control portion 200 reads the usage history in the memory (storage element) 90 and determines on the basis of the read information. For example, a mechanical flag protruding from the toner cartridge C may be provided. The mechanical flag may be configured to be retracted by coming into contact with a predetermined section of the main body when the toner cartridge C is attached to the printer main body A for the first time, and configured so as not to protrude thereafter. This allows the control portion 200 to determine the initial state by detecting whether the mechanical flag is in the retracted state. In this case, since the mechanical flag will not move across the photosensor once retracted within the cartridge, the control portion 200 can determine that the attached toner cartridge C is not in the initial state.

Additionally, the control portion 200 is connected with a remaining amount sensor 208 for detecting whether the remaining amount of toner stored in the developer storage chamber 152 of the process cartridge B is less than or equal to a predetermined amount.

Initial Sequence

Referring to FIGS. 1, 6, 7, and 17, the peeling operation of the sealing member 80 is now described. FIG. 1 is a flow chart showing a flow of operations in an initial sequence according to the present embodiment.

FIG. 17A shows a state of the toner cartridge C before attached to the printer main body A (unused state), with the toner discharge port 31*a* sealed with the sealing member 80.

As shown in FIG. 6, a memory 90 is attached to the toner cartridge C. When the toner cartridge C is attached to the printer main body A, the memory 90 (storage element) comes into contact with a reading device (not shown) provided in the printer main body A, allowing the information stored in the memory 90 to be read (S1001 in FIG. 1).

At this time, if it is detected from the information stored in the memory 90 that the toner cartridge C is new, an initial sequence is performed (Yes at S1002 in FIG. 1). This initial sequence refers to a sequence for peeling off the sealing member 80 from the toner discharge port 31*a* of the toner cartridge C and providing a state that enables the toner to be discharged in a stable manner. Such an initial sequence is performed when the cartridge is new (unused), as part of an initial operation that is performed prior to an image forming operation for forming an image on a recording material. If the toner cartridge C is not new, the initial sequence is not performed (No at S1002 in FIG. 1).

Figure 17B:
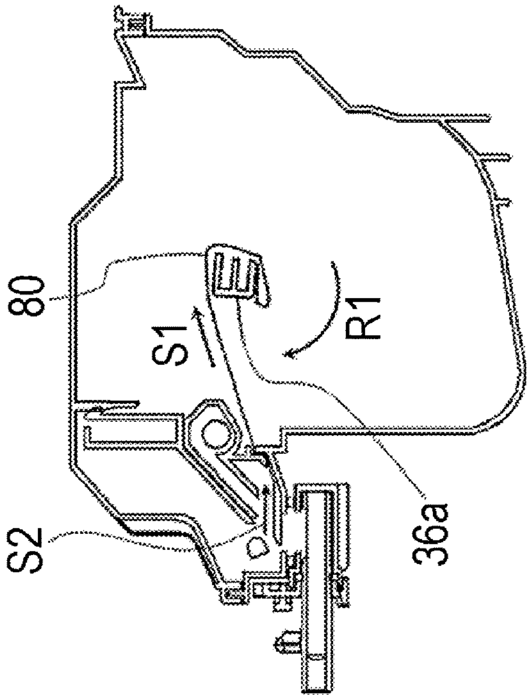
Figure 17C:
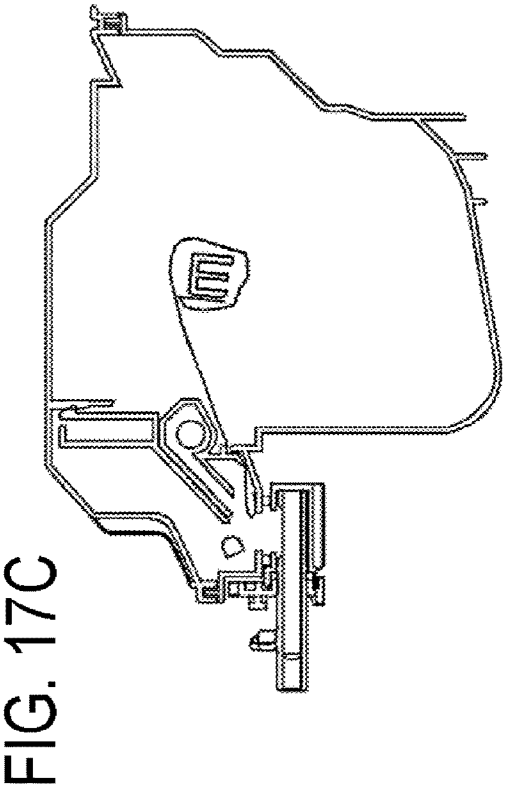
Figure 17D:
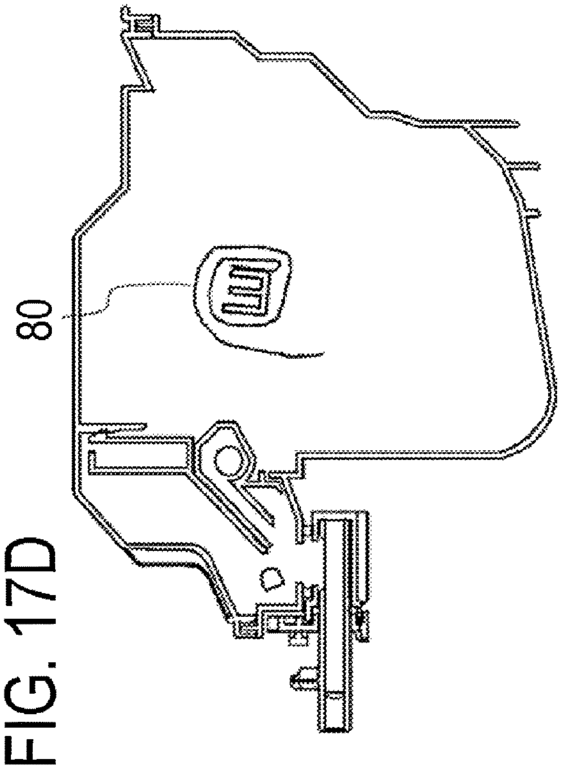

In the initial sequence, first, the stirring member 154 (FIGS. 3 to 5) of the printer main body A is driven and rotated in the drive direction of forward rotation, and the stirring driving input gear 38 (FIG. 14) and the stirring gear 38*b* (FIG. 14) are rotated forward (S1003 in FIG. 1). Thus, as shown in FIG. 17B, the stirring member 36 rotates in the R1 direction, the sealing member 80 starts to be wound up from the other end onto the shaft 36*a*, and a pulling force acts on the sealing member 80 in the direction of arrow S1. This pulling force causes one end of the sealing member 80, which is welded to the inner wall of the toner storage portion 30*a* of the toner cartridge C to seal the toner discharge port 31*a*, to start peeling off toward the right side as viewed in the figure (in the direction of arrow S1). As the shaft 36*a* rotates further, after the state shown in FIG. 17C, the sealing member 80 is entirely peeled off from around the toner discharge port 31*a* as shown in FIG. 17D, opening the toner discharge port 31*a*. After the toner discharge port 31*a* is opened, the driving of the stirring drive portion 206 (FIG. 18) of the printer main body A is stopped (S1004 in FIG. 1).

In a new toner cartridge C, the toner may be locally consolidated in the toner storage portion 30*a* due to vibrations during distribution, and the load for rotating the stirring member 36 may be higher than usual. For this reason, the rotational speed of the stirring drive portion 206 during the initial sequence is set to be slower than that during the replenishing operation, thereby reducing the load on the motor. The driving force provided from the printer main body A to the toner cartridge C when the sealing member 80 is peeled off is a driving force that causes the rotational speed of the stirring member 36 to be slower than the rotational speed caused the driving force provided from the printer main body A to the toner cartridge C in the toner supply operation during the image forming operation.

After the sealing member 80 is peeled off and the stirring drive portion 206 of the printer main body A stops providing the stirring member 36 with a driving force, the pump drive portion 207 (FIG. 18) of the printer main body A is driven to rotate in the opposite direction (second rotation direction) to the drive direction of forward rotation (first rotation direction) (S1005 in FIG. 1). This causes the pump/screw driving input gear 39, the cam drive gear 39*a*, the cam gear 39*b*, and the toner storage portion screw drive gear 39*c* to rotate in the reverse direction. When the cam gear 39*b* rotates in the reverse direction, the pump 37*a* is also driven to perform expansion and contraction actions. At this time, since the sealing member 80 of the toner discharge port 31*a* is already peeled off, the toner around the toner discharge port 31*a* is discharged from the toner discharge port 31*a*.

Here, as compared with a state in which the toner discharge port 31*a* is closed by the sealing member 80, peeling off the sealing member 80 in advance limits fluctuations in the internal pressure of the toner storage portion 30*a*, thereby reducing the driving load of the pump 37*a*.

Simultaneously with the pump operation, the screw member 35 rotates in the direction of arrow M (FIG. 15), thereby conveying the toner in the discharge chamber 81 (FIG. 17A) in the direction of the storage chamber 30*b* (the direction of arrow S3 in FIG. 15). This prevents the toner inside the discharge chamber 81 from becoming consolidated.

For example, if the pump drive portion 207 of the printer main body A is driven in forward rotation rather than reverse rotation in the initial sequence, the following concerns may arise depending on the configuration of the toner storage portion of the toner cartridge. That is, if toner is present in the discharge chamber 81 at the start of performing the initial sequence, the screw member 35 would add more toner into the discharge chamber 81. This would increase the toner density inside the discharge chamber 81, so that the pump 37*a* may fail to discharge the toner to the outside.

Also, the pump 37*a* is set in an expanded state (expanded state that increases the volume of the toner storage portion 30*a* or the discharge chamber 81) during assembly, and the toner cartridge C is shipped in this state. At the start of performing the initial sequence, the pump 37*a* is compressed from the expanded state. This operation allows the toner in the discharge chamber 81 to be discharged through the toner discharge port 31*a*, thereby limiting entry of toner into the pump 37*a* when the pump 37*a* expands from the compressed state next time.

Then, the driving of the pump drive portion 207 of the printer main body A is stopped (S1006 in FIG. 1), and the completion of the initial sequence is then recorded in the memory 90 of the toner cartridge C (S1007 in FIG. 1), completing the initial sequence.

As described above, according to this embodiment, it is possible to provide an image forming apparatus that prevents damage to parts and a motor due to an increase in the motor load during pump operation for a new toner cartridge, and allows the motor to be smaller.

In the above embodiment, the pump unit 37 and the like are driven in reverse rotation after the seal peeling operation. This configuration is most preferable from the viewpoint of minimizing an increase in the motor load. However, when the toner storage portion of the toner cartridge has a configuration that is unlikely to locally increase the toner density, the pump unit 37 and the like may be driven in forward rotation. That is, by controlling the timing of the operation of stirring and conveying the toner in the toner storage portion so as not to overlap with the seal peeling operation, it is possible to limit an increase in the motor load.

Also, the above embodiment has a configuration in which the driving of the pump unit 37 and the like after the seal peeling operation is started after stopping providing the stirring driving input gear 38 with a driving force. This configuration is most preferable from the viewpoint of minimizing an increase in the motor load. However, for example, if the limitation of the increase in torque during the seal peeling operation is sufficient, the driving of the pump unit 37 and the like may be started after the sealing member 80 is peeled off, without stopping providing the stirring driving input gear 38 with a driving force.

Also, the above embodiment is configured to start driving the pump unit 37 and the like after the sealing member 80 is completely peeled off, but the present invention is not limited to this configuration. For example, when at least a part of the toner discharge port 31*a* is opened, the sealing state of the toner storage portion 30*a* by the sealing member 80 is released (a state is achieved that allows communication between the toner storage portion 30*a* and the outside of the toner cartridge C). This limits an increase in the motor load considerably. As such, it may be configured to start the driving of the pump unit 37 and the like after the seal peeling operation has been started and the complete sealing state of the sealing member 80 has been released (at least a part of the toner discharge port 31*a* has been opened), but before the seal peeling operation is completed. In other words, the driving of the pump unit 37 and the like may be started after the weld portion 82 of the sealing member 80 is at least partially peeled off from the inner wall surface of the supply portion frame 31, thereby bringing the toner discharge port 31*a* into a state that provides communication between the inside and the outside of the toner storage portion 30*a*.

Furthermore, the above embodiment is configured to drive the pump unit 37 and the like during the initial sequence when the toner cartridge C is new. However, the pump unit 37 and the like may be driven for the first time during a toner replenishing operation after the initial sequence is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-197549, filed on Nov. 21, 2023, which is hereby incorporated by reference herein in its entirety.

What is claimed is:

1. An image forming apparatus comprising:

an apparatus main body including an image forming portion forming an image on a recording material by using developer; and a cartridge configured to be attachable to and detachable from the apparatus main body and capable of supplying the developer to the image forming portion, wherein the cartridge includes:

a storage portion that stores the developer and includes a discharge port for the developer;

a stirring member rotatably disposed inside the storage portion;

a variable-volume pump disposed in the storage portion so as to form, together with the storage portion, a storage space for the developer in the cartridge; and a sealing member including a sealing portion attached to an inner wall of the storage portion so as to seal the discharge port in a case where the cartridge is unused, and a fixed portion fixed to the stirring member, the sealing member being configured such that the sealing portion is peeled off from the inner wall by rotation of the stirring member, and wherein the apparatus main body includes:

a first drive portion providing the cartridge with a first driving force that drives the stirring member; and a second drive portion providing the cartridge with a second driving force that drives the pump, and wherein the second drive portion provides, in a case where the cartridge is unused, the cartridge with the second driving force after the first drive portion has started providing the first driving force, and the sealing portion is at least partially peeled off from the inner wall, and moreover the discharge port makes inside and outside of the storage portion communicate with each other.

2. The image forming apparatus according to claim 1, wherein in an initial operation performed prior to an image forming operation for forming an image on a recording material, the second drive portion provides, in a case where the cartridge is unused, the cartridge with the second driving force after the first drive portion has started providing the first driving force, and the sealing portion is at least partially peeled off from the inner wall, and moreover the discharge port makes inside and outside of the storage portion communicate with each other.

3. The image forming apparatus according to claim 1, wherein the second drive portion provides, in a case where the cartridge is unused, the cartridge with the second driving force after the first drive portion provides the cartridge with the first driving force and the sealing portion is peeled off from the inner wall.

4. The image forming apparatus according to claim 1, wherein the second drive portion provides, in a case where the cartridge is unused, the cartridge with the second driving force after the first drive portion provides the cartridge with the first driving force and the sealing portion is peeled off from the inner wall, and also after the first drive portion stops providing the cartridge with the first driving force.

5. The image forming apparatus according to claim 1, wherein the first driving force provided to the cartridge in a case of peeling the sealing portion from the inner wall is a driving force that causes a rotational speed of the stirring member to be slower than a rotational speed caused by the first driving force provided to the cartridge during an image forming operation for forming an image on a recording material.

6. The image forming apparatus according to claim 1, wherein an interior of the storage portion is partitioned into a storage chamber, in which the stirring member is disposed, and a discharge chamber, in which the discharge port is provided, in a manner that enables the storage chamber and the discharge chamber to communicate with each other, wherein the cartridge further includes a screw member rotatably disposed inside the storage portion, and the screw member is configured to be capable of forming a flow of developer in which the developer moves from the storage chamber to the discharge chamber, by rotation in a first rotation direction during an image forming operation for forming an image on a recording material, wherein the second driving force is a driving force that drives the screw member together with the pump, and wherein the second driving force provided to the cartridge in a case where the cartridge is unused is a driving force that rotates the screw member in a second rotation direction, which is opposite to the first rotation direction.

7. The image forming apparatus according to claim 6, wherein the pump is disposed in the storage portion so as to communicate with the discharge chamber, and is in an expanded state in which a volume of the storage portion is increased in a case where the cartridge is unused.

8. The image forming apparatus according to claim 6, wherein a supply operation in which the cartridge supplies developer to the image forming portion is performed by the first drive portion providing the cartridge with the first driving force and by the second drive portion providing the cartridge with the second driving force so that the developer in the storage chamber is conveyed toward the screw member by rotation of the stirring member, the developer is conveyed toward the discharge chamber from the storage chamber by rotation of the screw member, and the developer inside the discharge chamber is discharged through the discharge port by volume variation of the discharge chamber caused by the pump.

9. The image forming apparatus according to claim 8, wherein the supply operation is performed in a case where an amount of the developer stored in the image forming portion becomes less than or equal to a predetermined amount during the image forming operation.

10. The image forming apparatus according to claim 1, wherein the stirring member includes:

a rotation shaft; and a stirring portion that is a flexible sheet-shaped member including a fixed portion, which is fixed to the rotation shaft, and an end portion side that is away from the fixed portion and that is in contact with the inner wall of the storage portion.

11. The image forming apparatus according to claim 1, wherein the cartridge further includes a memory that stores information regarding whether the cartridge is unused.

12. An image forming apparatus comprising:

an apparatus main body including an image forming portion forming an image on a recording material by using developer; and a cartridge configured to be attachable to and detachable from the apparatus main body and capable of supplying the developer to the image forming portion, wherein the cartridge includes:

a storage portion that stores developer and includes a discharge port for the developer;

a stirring member rotatably disposed inside the storage portion;

a variable-volume pump disposed in the storage portion so as to form, together with the storage portion, a storage space for the developer in the cartridge; and a sealing member including a sealing portion attached to an inner wall of the storage portion so as to seal the discharge port in a case where the cartridge is unused, and a fixed portion fixed to the stirring member, the sealing member being configured such that the sealing portion is peeled off from the inner wall by rotation of the stirring member, wherein the apparatus main body includes:

a first drive portion providing the cartridge with a first driving force that drives the stirring member; and a second drive portion providing the cartridge with a second driving force that drives the pump, and wherein the second drive portion provides, in a case where the cartridge is unused, the cartridge with the second driving force after the first drive portion has started providing the first driving force.

13. The image forming apparatus according to claim 12, wherein an interior of the storage portion is partitioned into a storage chamber, in which the stirring member is disposed, and a discharge chamber, in which the discharge port is provided, in a manner that enables the storage chamber and the discharge chamber to communicate with each other, wherein the cartridge further includes a screw member rotatably disposed inside the storage portion, and the screw member is configured to be capable of forming a flow of developer in which the developer moves from the storage chamber to the discharge chamber by rotation in a first rotation direction during an image forming operation for forming an image on a recording material, wherein the second driving force is a driving force that drives the screw member together with the pump, and wherein the second driving force provided to the cartridge in a case where the cartridge is unused is a driving force that rotates the screw member in a second rotation direction, which is opposite to the first rotation direction.

14. The image forming apparatus according to claim 13, wherein the pump is disposed in the storage portion so as to communicate with the discharge chamber, and is in an expanded state in which a volume of the storage portion is increased in a case where the cartridge is unused.

15. The image forming apparatus according to claim 13, wherein a supply operation in which the cartridge supplies developer to the image forming portion is performed by the first drive portion providing the cartridge with the first driving force and by the second drive portion providing the cartridge with the second driving force so that the developer in the storage chamber is conveyed toward the screw member by rotation of the stirring member, the developer is conveyed toward the discharge chamber from the storage chamber by rotation of the screw member, and the developer inside the discharge chamber is discharged through the discharge port by volume variation of the discharge chamber caused by the pump.

16. The image forming apparatus according to claim 15, wherein the supply operation is performed in a case where an amount of the developer stored in the image forming portion becomes less than or equal to a predetermined amount during the image forming operation.

17. The image forming apparatus according to claim 12, wherein the stirring member includes:

a rotation shaft; and a stirring portion that is a flexible sheet-shaped member including a fixed portion, which is fixed to the rotation shaft, and an end portion side that is away from the fixed portion and that is in contact with the inner wall of the storage portion.

* * * * *